(12) United States Patent
Heifetz

(10) Patent No.: US 6,586,080 B1
(45) Date of Patent: Jul. 1, 2003

(54) SEALING SHEET ASSEMBLY FOR CONSTRUCTION SURFACES AND METHODS OF MAKING AND APPLYING SAME

(76) Inventor: Raphael Heifetz, Dome House, Feinberg St., Hadera 38247 (IL)

( * ) Notice: Subject to any disclaimer, the term of this patent is extended or adjusted under 35 U.S.C. 154(b) by 0 days.

(21) Appl. No.: 09/530,547
(22) PCT Filed: Oct. 29, 1998
(86) PCT No.: PCT/IL98/00525
§ 371 (c)(1), (2), (4) Date: May 2, 2000
(87) PCT Pub. No.: WO99/22935
PCT Pub. Date: May 14, 1999

(30) Foreign Application Priority Data

Nov. 3, 1997 (IL) ................................. 122095
Feb. 18, 1998 (IL) ................................. 123356
Aug. 9, 1998 (IL) ................................. 125707

(51) Int. Cl.⁷ .............................. B32B 5/04; B32B 5/18
(52) U.S. Cl. .................. 428/198; 428/188; 428/215; 428/314.4; 428/317.1; 428/317.5; 428/319.3
(58) Field of Search .......................... 428/215, 314.4, 428/317.1, 317.5, 319.3, 489, 198, 188; 442/30, 38, 45; 52/408, 515, 793.11

(56) References Cited

U.S. PATENT DOCUMENTS 4,948,655 A * 8/1990 Danese ...................... 428/213

* cited by examiner

Primary Examiner—Alexander S. Thomas
(74) Attorney, Agent, or Firm—G. E. Ehrlich Ltd.

(57) ABSTRACT

A sealing sheet (10) assembly bondable to a construction surface comprising (a) an upper layer (14) of a first substance, the upper layer being selected fluid impermeable; and (b) a lower flexible layer (16) of a second substance, the lower flexible layer being bondable to the construction surface. The upper layer and the lower flexible layer are at least partially attached to one another, wherein a combination of the upper layer, the lower layer and the attachment or the partial attachment of the layers to one another are selected such that tensile forces resulting from constructional movements acting upon the sealing sheet result in a local detachment or relative displacement of the upper layer and the lower flexible layer, thereby the ability of the lower flexible layer of transmitting the forces onto the upper layer is remarkably reduced, resulting in improved service of the sealing cover as a whole. The attachment is selected such that a spread of a leakage between the layers via a tear formed in the upper layer is locally restricted.

71 Claims, 8 Drawing Sheets

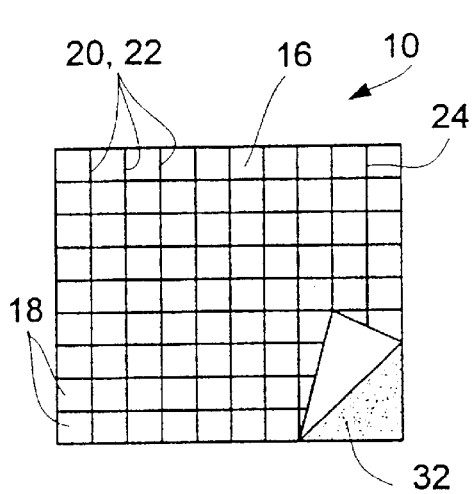
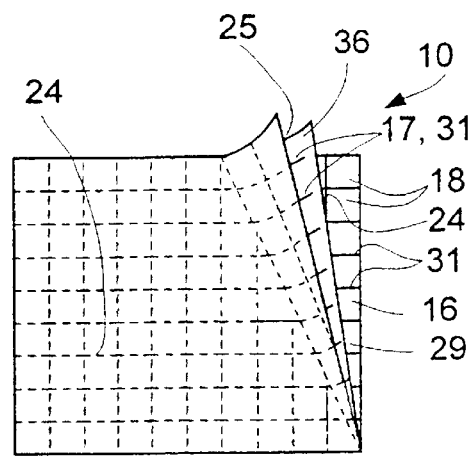
Fig. 1b  Fig. 1a
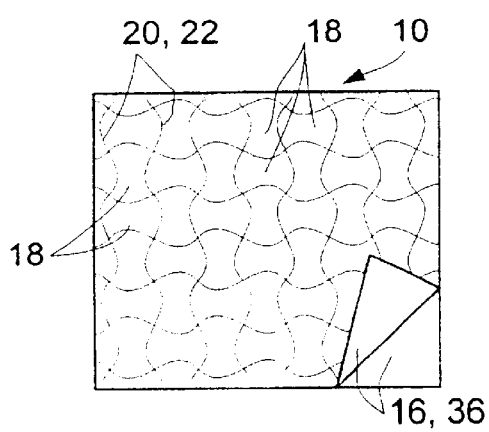
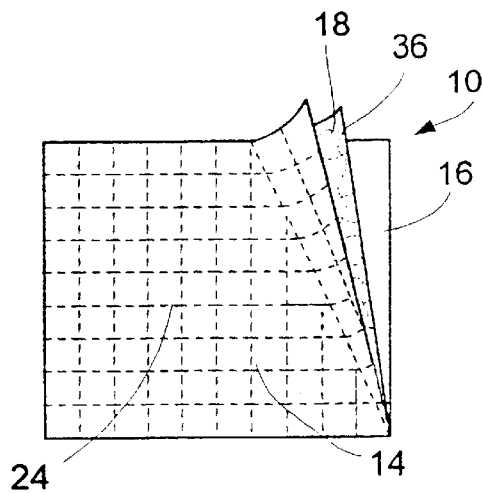
Fig. 2b  Fig. 2a
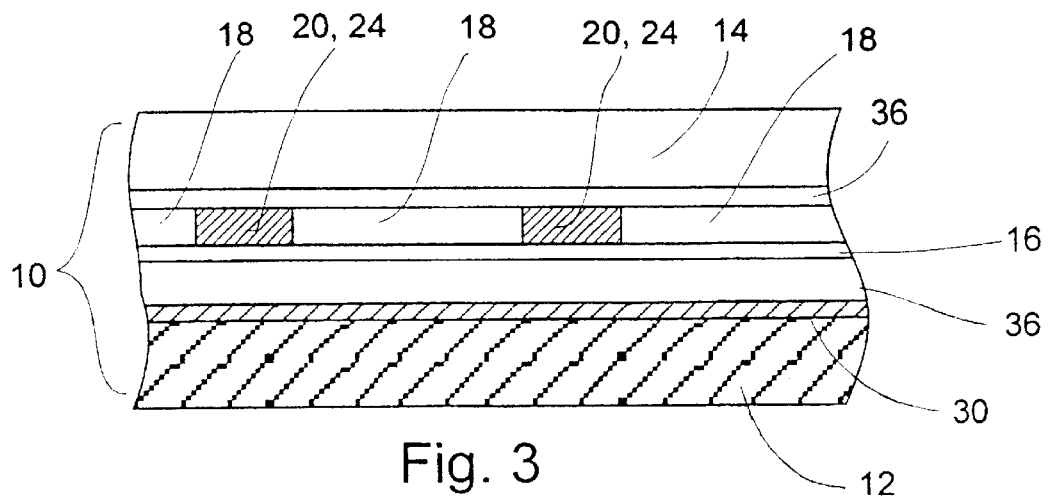
Fig. 3

SEALING SHEET ASSEMBLY FOR CONSTRUCTION SURFACES AND METHODS OF MAKING AND APPLYING SAME

FIELD AND BACKGROUND OF THE INVENTION

The present invention relates to a sealing sheet assembly and to methods of making and using same. More particularly, the present invention relates to a sheet assembly useful in water and/or gas proofing a surface of a construction which may find uses in various construction and civil engineering applications including, but not limited to, waterproofing constructional surfaces, e.g., roofs, cabins, walls and underground foundation waterproofing, fluid-proofing fluid reservoirs, waterproofing underwater containers, e.g., submarines, and fluid-proofing containers under internal or external pressure, e.g., aircrafts and spacecrafts.

Most particularly, the present invention relates to a multilayer flexible polymeric sealing sheet bondable to a construction surface, which is less damageable by strains and movements inflicted upon it by the construction surface as compared with the prior art, such that desired sealing capabilities are maintained even under conditions such as massive cracks formation, fissures and/or structural spaces formation within the surface.

The term "construction surface" as used herein refers to any surface which is expected to be water or fluid impermeable.

Flexible sheet-like membranes and laminates (referred to herein as "sheets") are frequently used for waterproofing by applying one or more layers of same onto a protected surface. Such sheets are made of a variety of materials, such as, but not limited to, coal tar, bitumen and synthetic polymers, which are formed as sheet-like substances of desired sealing properties. Material and substance properties should meet the requirements of any particular structure, building, authority, climate, chemical and physical environment, required durability, cost effectiveness and the like.

The trend towards irregular roof surfaces, such as, but not limited to, folded plates, hyperbolic paraboloids, domes and barrel shells, has increased the use of plastics or synthetic rubber thermoplastic polymer elastomers as roof coatings. Their advantages include light weight, shape adaptability, good heat reflectivity and high elasticity at moderate temperatures.

Prior art sheets are typically made of thick, flexible and strong materials to prevent their rupture during use. They are either bonded or laid non-bonded over the protected surface.

Bonding is advantageous because lateral massive spread (flood) of water in case of a tear in the sheet is prevented, however, bonding is disadvantageous because, as further detailed below, rupture of the bonded sheet due to cracks formation in the protected surface is readily occurring.

As a result, in many cases a preferred solution for roofing is to lay a loose water-proof sheet, which is not bonded to the surface. This solution is designed to free the membrane from all sorts of stresses caused by sheer and tensile forces resulting from the substrate as a result of thermal and constructive stresses. These forces express themselves often by demonstrating cracks, spaces and fissures which are in widening and shrinking motion (usually cyclic) through the cross-section of the roof or through the walls of the construction.

This motion exhibits a change in the cracks width that tends to increase as a function of many physical factors: e.g., thermal changes or age of the building/construction. In new constructions or after a short period of physical and chemical activities to which the construction is exposed, cracks might appear as a result of climate changes; day and night cycles; extreme changes in temperature; erosion and corrosion of constructive materials; changes in humidity; mistakes in engineering; earth movements; different values of thermal modules of expansion; shrinkage and inflating as a result of vapour pressure, etc.

Often these movements of the construction substrate do not appear in cycles, but expressed as continuous widening of the cracks and spaces or of the expansion joint that are designed to reduce such stresses.

The disadvantages of this concept are that the sheet is subject to elevation and flapping caused by storm wind. Unsolved disadvantage is flooding extensive areas of the protected surface under the sheet, even in the event of a single tiny tear in the sheet. Thus, loose laying is advantageous because the sheet is mostly not affected by cracks formation, however, it is disadvantageous since if a tear should occur massive lateral spread of water is experienced.

Examples of prior art sheets include (i) ethylene propylene diene monomer (EPDM) sheets, which accept about 250%–450% elongation and are typically used at thicknesses ranging between 0.8–1.5 millimeters, mostly in a non-bonded free floating sheet, protected from wind effects by a layer of gravel or concrete placed thereon; (ii) reinforced bitumen sheets, 4–5 millimeters thick, bonded to the surface, which accept 30%–120% elongation and have tensile strength of about 30–80 Kg/5 centimeters; and (iii) plasticized, textile reinforced poly vinyl chloride (PVC) sheets, which accept about 15–25% elongation, 1–2 millimeters thick, having a tensile strength of about 100–160 Kg/5 centimeters, applied mostly as non-bonded free floating sheets, protected from wind elevation by screws or alternatively as bonded sheets being fully bonded to the construction surface.

To illustrate the cracks formation effect upon a protective sheet, consider a crack in a covered surface which grows from 0.05 millimeters in width at the time of application to 3 millimeters thereafter. This represents a 6,000% increase in width. A prior-art, flexible roofing sheet, firmly bonded to the working surface will usually tear under such conditions, causing failure of its sealing properties.

Therefore, wherever massive cracking or strong movement is expected, thicker and/or free-floating (non-bonded) sheets are preferably employed.

In large constructions, thermal and constructive stresses cause tremendous movements, e.g., between constructive roofing elements. In extreme, but quite frequent cases, massive and quick forming cracks, which demonstrate expansion in ranges of thousands percents per hour, cycling on a daily basis, combine shearing action with abrasion upon the sealing sheet. No bonded prior art sheet can withstand these forces without tearing.

When a lower zone of the sheet cross section reaches its maximal elongation ability, rupturing tends to climb along the cross-section, even as a result of smaller changes in stress. Often, a rupture tends to enlarge itself through the whole thickness of the sheet, even without any additional tensile or shear stresses, causing a failure of the sheet.

The use of a strong sealing material will commonly be of no help due to the forceful structural tension.

The cost of a thick monolayer (2.5–4 mm thick) with high and lasting elongation ability (e.g., above 300% after 10–15 years of aging) characterized by chemical and mechanical resistance properties is rather excessive. Such a sheet may provide very good values of bridging ability above small and medium cracks. But, even a 4 mm thick elastic sheet, bonded to the substrate, will not withstand massive movements associated with crack or space formation and/or joints-expansion. When the lower zone of the membrane cross section comes to its maximal elongation ability it ruptures. The rupture tends to progress along the cross-section to the upper surface of the sheet. Most often, the rupture tends to enlarge itself through the whole width of the sheet, even without any additional tensile or shear stresses applied thereto, causing a failure of the coating in the most critic location in the construction, where there is a crack.

Lateral tear resistance of polymeric sheets is not in direct proportion to their thickness. Once an initiation of a long and deep tear is experienced, soon thereafter a total local breaking of the sheet occurs.

Elastic polymers characterized in high elongationability cannot be efficiently reinforced. In such conditions, elastomers and thermoplastic polymers forming a sheet show high values of creeping and fatigue, expressed by decreasing in breaking strengths and other mechanical characteristics that typically cause fast progression of a rupture therethrough. Thermosetic polymers express similar characteristic of failure and fatigue, although their creeping values are usually negligible.

Although the thickness of an elastic thick monolayer sheet provides a large distance between the shear activities generated by the working substrate and the upper surface of the sealing sheet, this costly distance lacks enough shear resistance so as to provide efficient protection to the outer surface of the sheet.

The use of a very elastic, too thin, sheets shows poor bridging ability above massive cracks as a result of the missing thickness and the low abrasion and impact resistance.

The use of infirm bonding of the sheet to the protected surface in many cases demonstrates high frequency of sheet separation as a result of vapour pressure characterizing porosive constructions. Large areas of separation between the sheet and the substrate caused by accumulating shear forces gathered from very large bonded areas along with the disability to control the adhesion strengths to stay inside the narrow margin under temperature changes and aging, cause breaking or too large released areas of the sheet.

Many commercial roof and wall sealing sheets are known.

Chemseal Co., Tel-Aviv, Israel, distributes a two-part sealing compound under the trade name "ELASTOSEAL". This material is based on polysulphides and on a synthetic rubber Thiokol, which are mixed together and harden into a protective sheet within about two hours after laying. This sealant is however intended to resist various chemicals, as well as water, and is therefore priced higher as compared with other roofing sheets.

Chemiprod, Kibbutz Tel Yitzchak, Israel, distributes a liquid synthetic rubber for roof and wall sealing under the trade name "LIGO", made with a long durability of high elongation to provide waterproofing upon cracked substrate.

South African Surface Coatings, Cape Town, South Africa, distributes a plastic sealant under the trade name "POLAROOF". This is a trowel-applied material having a 1.28 density when wet and requires two coats and a curing time of 3–7 days.

Both "LIGO" and "POLAROOF" are used in thicknesses usually under one millimeters and provide limited ability to overcome major cracks even when thickness is doubled.

Combined layers of different plastics are used to prevent evaporation from water reservoirs. The tearing forces on such floating covers are distributed. These sheets are not configured to be bonded to any surface.

In the past, sealing units incorporating foamed polyurethane or foamed polystyrene have been used because of their thermal properties. However, these materials have an elongation of only about 5% and therefore cannot resist significant compressive deformation This lack of spring-back properties renders these materials inferior for roofing purposes since they are damaged if someone treads thereon. For example, IL Pat. No. 19514 to Allied Chemical Corporation teaches a roof insulation comprising a board-like core of rigid urethane foam, wherein waterproof layers cover each face of the core. This insulation is proposed in thicknesses ranging from 0.6 centimeters to 10 centimeters and has the disadvantage of lacking flexibility to adapt itself to irregular roof shapes or to absorb thermally induced movements in the structure to which it is attached, since urethane is a rigid material of negligible elasticity.

There is thus a widely recognized need for, and it would be highly advantageous to have, a sealing sheet devoid of the above limitations.

SUMMARY OF THE INVENTION

According to the present invention there is provided a sealing sheet assembly which can be used to provide a fluid-proof cover for construction surfaces.

According to further features in preferred embodiments of the invention described below, provided is a sealing sheet assembly bondable to a construction surface comprising (a) an upper layer of a first substance, the upper layer being selected fluid impermeable; and (b) a lower flexible layer of a second substance, the lower flexible layer being bondable to the construction surface, the upper layer and the lower flexible layer being at least partially attached to one another; wherein a combination of the upper layer, the lower layer and the at least partial attachment of the layers to one another are selected such that tensile forces resulting from constructional movements acting upon the sealing sheet, result in a local detachment or relative displacement of the upper layer and the lower flexible layer, thereby an ability of the lower flexible layer of transmitting the forces onto the upper layer is remarkably reduced, resulting in improved service of the sealing cover as a whole, the attachment is selected such that a spread of a leakage between the layers via a tear formed in the upper layer is locally restricted.

According to still further features in the described preferred embodiments the combination of the upper layer, the lower layer and the attachments or partial attachment of the layers to one another are selected such that peeling forces acting to separate the layers of the sealing sheet, result in a detachment of the upper layer and the lower flexible layer, such that the upper layer remains substantially undamaged.

According to still further features in the described preferred embodiments the lower layer is capable of at least 200% elongation, preferably it is elastic, however it can also be plastic.

According to still further features in the described preferred embodiments the attachment is capable of at least 200% elongation, preferably it is elastic, however it can also be plastic.

According to still further features in the described preferred embodiments the attachment or the partial attachment includes a formation of closed cells between the layers.

According to still further features in the described preferred embodiments the closed cells having an average area of 1 square millimeter to 100 square centimeters per cell.

According to still further features in the described preferred embodiments the upper layer has a given breaking strength, and the lower flexible layer has a breaking strength at least 60% lower than the given breaking strength of the upper layer.

According to still further features in the described preferred embodiments the upper layer has a given breaking strength, and the attachment between the layers has a breaking strength at least 30% lower than the given breaking strength of the upper layer.

According to still further features in the described preferred embodiments the breaking strength of the lower flexible layer is at least 80% lower than the given breaking strength of the upper layer.

According to still further features in the described preferred embodiments the upper layer has a given thickness, and the lower flexible layer has a thickness at least 65% lower than the given thickness of the upper layer. The thickness of the lower layer is optimally selected between 0.05 millimeters and 0.25 millimeters.

According to still further features in the described preferred embodiments zones which serve for attaching the upper layer and the lower flexible layer encompass about 1% to about 25% of a total area of the sealing sheet assembly, whereas the closed cells encompass about 99% to about 75%, respectively, of the total area.

According to still further features in the described preferred embodiments the zones are arranged in crossing or tangential stripes.

According to still further features in the described preferred embodiments the stripes have a width ranging between 0.1 millimeters and 15 millimeters.

According to still further features in the described preferred embodiments the stripes are substantially linear stripes.

According to still further features in the described preferred embodiments the stripes follow a wave pattern, e.g., sinusoidal pattern, broken line pattern or circles.

According to still further features in the described preferred embodiments the upper layer includes a reinforcing structure (e.g., various woven and non-woven cloths, screens, gauze or free fibers made of materials such as, but not limited to, polyester, glass, polyamide, nylon and carbon fibers) embedded therein.

According to still further features in the described preferred embodiments the reinforcing structure protrudes from a lower surface of the upper layer to form ridges thereon which serve for effecting the partial attachment.

According to still further features in the described preferred embodiments attaching the upper layer and the lower flexible layer to one another to form the closed cells therebetween is effected via an adhesive.

According to still further features in the described preferred embodiments the adhesive is a self adhered pressure sensitive adhesive.

According to still further features in the described preferred embodiments is attaching the upper layer and the lower flexible layer to one another to form the closed cells therebetween is effected via welding.

According to still further features in the described preferred embodiments attaching the upper layer and the lower flexible layer to one another to form the closed cells therebetween is effected via a thermoplastic adhesive screen.

According to still further features in the described preferred embodiments the sealing sheet assembly further comprising a cloth material attached underneath the lower flexible layer and forms a part thereof, the cloth material is bondable to the construction surface.

According to still further features in the described preferred embodiments the sealing sheet further comprising a laminate placed between the upper and lower flexible layers for restricting migration of plasticizers from the upper layer to the lower flexible layer.

According to still further features in the described preferred embodiments the laminate is substantially fully attached to the upper layer, whereby the closed cells are formed between the laminate and the lower flexible layer.

According to still further features in the described preferred embodiments the laminate is attached to the lower flexible layer, whereby the closed cells are formed between the laminate and the upper layer.

According to still further features in the described preferred embodiments the second substance is selected such that the lower flexible layer restricts migration of plasticizers from the upper layer to the construction surface.

According to still further features in the described preferred embodiments the lower flexible layer is a foamed substance.

According to still further features in the described preferred embodiments, a lower surface of the upper layer or an upper surface of the lower layer is formed with ridges which serve for effecting the partial attachment and the formation of closed cells.

According to still further features in the described preferred embodiments the upper layer and the lower flexible layer being substantially fully attached to one another via a week attachment.

According to still further features in the described preferred embodiments the upper layer and the lower flexible layer being further attached to one another sporadically via a stronger attachment.

According to still further features in the described preferred embodiments the weak attachment is effected by an approach selected from the group consisting of weak welding and a use of a weak adhesive.

According to still further features in the described preferred embodiments the weak attachment is effected by an approach selected from the group consisting of weak welding and a use of a weak, preferably water repellent, adhesive, the stronger attachment is effected by an approach selected from the group consisting of stronger welding and a use of a stronger adhesive.

According to another aspect of the present invention there is provided a multi-layer unit designated for being bonded onto a surface of a construction and thereby sealing the surface of the construction and comprising (a) an upper sealing flexible layer having at least it's outer part protected against chemical and physical environmental influence; and (b) a lower layer bonded to the upper layer, the lower layer being elastic, closed cell, foamed polymeric material having a module of elasticity significantly lower than that of the upper layer and having tensile strength significantly lower than that of the upper layer, the material having an elongation at break of at least 25% in a designated temperature range, and a gas volume in a range of 65% to 99% of it's total volume. Alternatively, the lower layer is a flexible plastic non-polymeric material, such as, but not limited to, bitumen, modified bitumen rubber, etc. Yet alternatively, the lower layer is a flexible elastic non-polymeric material. Wherein, if the upper layer is thermoplastic or thermosetic, and further wherein if the lower layer has a thickness of above about 2 mm, or if the upper layer is of bitumen, then, the upper and lower layers are selected such that if the tensile strength of the upper layer, according to it's definition in ASTM Standard D-751, method A (which is incorporated by reference as if fully set forth herein), is expressed in units of Newton per 50 mm width, and the tensile strength of the lower layer, according to it's definition in Din Standard 53571 (which is incorporated by reference as if fully set forth herein), is expressed in units of Newton per 1 mm squared, then, the ratio between the tensile strength of the upper layer and the tensile strength of the lower layer is greater than 200, whereas, if the upper layer is thermoplastic or thermosetic, and further wherein if the lower layer has a thickness of below about 2 mm, then, the lower and upper layers are selected such that a ratio of the tensile strengths of the upper and lower layers, when expressed in the units, respectively, is greater than 1000.

According to another preferred embodiment of the present invention there is provided a multi-layer unit for bonding onto a surface of a construction mainly a roof deck. According this embodiment of the present invention, the lower and upper layers are selected such that (i) if the tensile strengths of the upper layer according to it's the standard is below 70 kg to 5 cm, than the lower is selected having a density lower than 60 kg per cubic meter, preferably—less than 30 kg per cubic meter; (ii) if the tensile strength of the upper layer is below 170 kg to 5 cm, then the lower is selected having a density lower than 70 kg per cubic meter, preferably less than 40 kg per cubic meter ; (iii) if the tensile strength of the upper layer is below 250 kg to 5 cm, then the lower is selected having a density lower than 100 kg per cubic meter preferably less than 50 kg per cubic meter; (iv) if the tensile strength of the upper layer is 350–200 kg to 5 cm (mainly for civil engineering uses) than the lower is selected having a density lower than 160 kg per cubic meter preferably less than 50–70 kg per cubic meter; and (v) if the tensile strength of the upper layer is above 350 kg to 5 cm, then the lower is selected having a density lower than 350 kg per cubic meter. Those density values of the lower layer are for providing a better stress dampening mechanism, that will ensure detachment of the upper layer from the substrate wherever high stresses are transmitted as a result of movements of the substrate in the vicinity of cracks, spaces, fissures and expansion joints in the construction. The detachment will occur by rupture that will develop through the cross section of the lower layer.

According to another aspect of the present invention there is provided a multi-layer unit for bonding onto a surface of a construction and thereby sealing the surface of the construction comprising (a) an upper sealing flexible layer having at least it's outer part protected against chemical and physical influence; and (b) a lower layer bonded to the upper layer, the lower layer being elastic, closed cell, foamed polymeric material; wherein bonding the upper and lower layers is effected by an adhesive or welding, such that non-bonded closed cells are formed between the upper and lower layers.

According to another aspect of the present invention there is provided a method of attaching a sealing unit to a surface of a construction featuring rough nicrostructure, the method is for fluidproofing the construction, the method comprising the steps of (a) providing a sealing unit featuring an elastic, foamed, polymeric lower layer and an upper layer bonded thereto, the lower layer featuring a compression-deflection properties; (b) spreading an adhesive over the surface, the lower layer or both; (c) placing the sealing unit over the surface such that the lower layer faces the surface; and (d) applying pressure over the sealing unit; wherein the compression-deflection properties of the lower layer and the pressure are selected such that the lower layer penetrates into the microstructure of the surface, to thereby form a substantially continuous contact therebetween, so as to improve bonding of the sealing unit to the surface, while reducing adhesive quantities required therefor.

The present invention successfully addresses the shortcomings of the presently known configurations by providing a sealing sheet assembly which is more durable as compared with prior art sheets although it is bounded to the protected surface, such that when it tears, no uncontrolled massive flood is experienced.

BRIEF DESCRIPTION OF THE DRAWINGS

The invention herein described, by way of example only, with reference to the accompanying drawings, wherein:

FIGS. 1a–b and 2a–b are top views of few preferred embodiments of the sealing sheet assembly according to the first aspect of the present invention;

FIG. 3 is a cross section view of a preferred embodiment of the sealing sheet assembly according to the first aspect of the present invention when attached to a construction surface;

DESCRIPTION OF THE PREFERRED EMBODIMENTS

Figure 4:
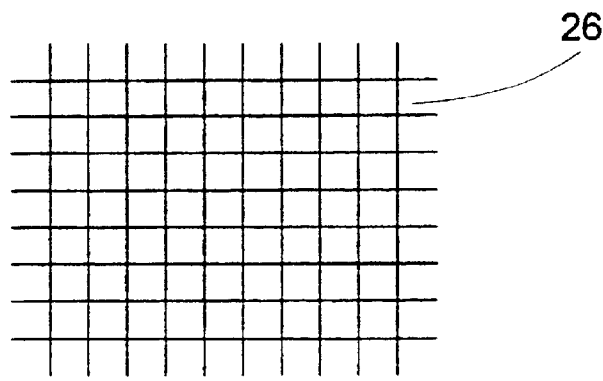
FIG. 4 is a top view of a thermoplastic adhesive screen used in the sealing sheet assembly according to the first aspect of the present invention.

The present invention is of a sealing sheet assembly which can be used to provide a fluid-proof cover for construction surfaces. Specifically, the present invention can be used to provide a sealing sheet which is bonded (e.g., adhered, welded) to a construction surface, and therefore enjoys the advantages of conventional bonded sheets, yet it is to a lesser degree affected by movements in the construction surface as compared with conventional bonded sheets.

The principles and operation of a sealing sheet assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1–3 illustrate one aspect of the invention.

Thus, according to this aspect of the present invention a sealing sheet assembly, referred to herein below as sealing sheet assembly 10, which is bondable to a construction surface 12 (shown in FIG. 3) is provided.

Sealing sheet assembly 10 includes an upper layer 14 made of a first substance. Upper layer 14 is selected fluid (e.g., water and gas) impermeable and preferably also environmental resistant. Thus, upper layer 14 is preferably selected resistant against chemical and physical aging imposed by climate conditions, such as, but not limited to, sun UV radiation, ozone, rain, snow, etc. effects, and the effect of organic chemicals released to the atmosphere as pollution.

Upper layer 14 is preferably flexible and may be, for example, bitumen, e.g., 3–6 millimeters thick sheet, polymer modified bitumen, such as, but not limited to, SBS (styrene-butadiene-styrene) or APP (atactic polypropylene), thermoset materials, such as EPDM, Metallocen®, cross-linked polyolefin, styrene-butadiene-rubber based and acrylic based elastomers, polyethylene, LDPE, VLDPE, ethylene vinyl acetate, thermoplastic materials such as, but not limited to, PVC, PVC formulated to retain plasticizers, polyvinyl-chloride plasticized by solid copolymer plasticizer Elvaloy® and flexible polyurethane. The above materials and other polymers may be combined and/or covered with an UV and/or IR radiation reflective paint or metallic film with low emissivity and/or reinforced by textile, screen and/or fibers. As other polymers they might include common protectors and additives, e.g., for weathering, ozone, UV radiation, fungus etc., in order to improve their chemical and mechanical properties.

Sealing sheet assembly 10 further includes an lower flexible layer 16 made of a second substance. Lower flexible layer 16 is bondable (e.g., adhereable, weldable) to construction surface 12. The second substance may be any of the above substances listed with respect to layer 14, preferably, polyethylene. However, for reasons that will become apparent to one ordinarily skilled in the art lower layer 16 is preferably selected capable of elongation, e.g., capable of at least 200% elongation, preferably between 200%–300%, more preferably 300%–500%, either plastic or elastic elongation.

According to a preferred embodiment of the invention, upper layer 14 and lower flexilayer 16 are at least partially attached to one another. The combination of upper layer 14, lower layer 16 and the attachment or partial attachment formed therebetween are selected such that tensile forces resulting from constructional movements (e.g., crack formation/expansion and/or joint expansion as a result of, for example, constructional stresses, thermal stresses and/or foundation movements, in other words, gap formation or expansion), acting upon sealing sheet 10, result in a local detachment or relative displacement (sliding) of upper layer 14 and lower flexible layer 16. As a result, the ability of lower flexible layer 16 of transmitting such forces onto upper layer 14 is remarkably reduced, resulting in improved service of sealing cover 10 as a whole.

According to a preferred embodiment of the present invention, sealing sheet assembly as a whole is expected to bridge a gross movement, for example, a 0.2 millimeters gap when expanding at least 1000%, preferably at least 2000%, more preferably at least 3000%, most preferably at least 5000%, ideally at least 6000% or more, preferably either abruptly (e.g., within seconds or less) or progressively (e.g., along minutes or hours).

Furthermore, as described in more detail below, the attachment is selected such that a spread of a leakage between layers 14 and 16 via a tear formed in upper layer 16 is locally restricted to no more than 10 centimeters, preferably, no more than 20 centimeters, more preferably no more than 10 centimeter, most preferably no more than about 1–10 millimeters away from the tear.

In addition, layer 14, layer 16 and the attachment therebetween are preferably selected to perform as described above under any desired service temperatures, e.g., –60° C. to +100° C., preferably, –200° C. to +100° C., during its expected service, say at least 2 years, preferably at least 5 years, more preferably 10 years, most preferably 15 or 20 years or more.

According to a preferred embodiment of the present invention layers 14 and 16 are partially attached to one another to form closed cells 18 therebetween, such that the ability of lower flexible layer 16 of transmitting forces acting thereupon by construction 12 onto upper layer 14 is reduced. Closed cells 18 are best seen in the cross section of FIG. 3. Please note that in FIGS. 1a–b and 2a–b, which are top views, only the location of the cells when layers 14 and 16 are attached to one another is denoted by numerical 18. Closed cells 18 preferably have an averaged area of 1 square millimeter to 100 square centimeters per cell, preferably between about 50 square millimeters and about 400 square millimeters per cell. They may be formed in any geometrical or random shapes.

Leaving closed cells 18 while attaching layers 14 and 16, ensures that if layer 16, which is bonded to construction surface 12 tears due to forces imposed thereon by construction 12, the tearing forces are to a lesser degree transferred to upper layer 14. On the other hand, should, for any reason, layer 14 tears, a lateral flood is not expected due to the closed cell formation.

If both layers 14 and 16 tear at the same location, again, a lateral flood is not expected due to the closed cell formation and further due to the complete bonding of layer 16 to construction surface 12.

According to another preferred embodiment of the invention upper layer 14 has a given breaking strength, say between 100 and 160 Kg per 5 centimeters according to ASTM D 751/D 638, which is incorporated by reference as if fully set forth herein, and lower flexible layer 16 has a breaking strength at least 60%, preferably 80% or more, lower than the given breaking strength of upper layer 14, thereby effecting the reduction in the ability of lower flexible layer 16 of transmitting forces (e.g., forces induces by cracks formation) acting thereupon by construction 12 to upper layer 14. The breaking strength of layer 16 should be just sufficient to resist storm winds (e.g., tornado).

According to another preferred embodiment of the present invention, upper layer 14 has a given breaking strength, say between 100 and 160 Kg per 5 centimeters, and the attachment between layers 14 and 16 has a breaking strength which is at least 30% lower, preferably even lower, say about 60% lower, than the given breaking strength of upper layer 14, thereby effecting the reduction in the ability of lower flexible layer 16 of transmitting forces acting thereupon by construction 12 to upper layer 14. The breaking strength of the attachment should be just sufficient to resist storm winds (e.g., tornado) and man activities.

The breaking strengths herein described should be applicable also following prolonged use (e.g., 10–20 years), and therefore their selection depends upon the climate in the area where assembly 10 is implemented.

According to yet another preferred embodiment of the present invention, upper layer 14 has a given thickness, say between 1 and 5 millimeters, and lower flexible layer 16 has a thickness at least 65% lower than the given thickness of upper layer 14, thereby assisting in reducing the ability of lower flexible layer 16 of transmitting forces acting thereupon by construction 12 to upper layer 14.

According to still another preferred embodiment of the present invention, zones 20 which serve for attaching upper layer 14 and lower flexible layer 16 encompass about 1% to about 25% of a total area of sealing sheet assembly 10, whereas closed cells 18 encompass about 99% to about 75%, respectively, of the total area. As best seen in FIGS. 1a–b and 2a–b, zones 20 are arranged in crossing or tangential stripes 22. Preferably, stripes 22 have a width ranging between 0.1 millimeters and 15 millimeters, preferably about 0.8 millimeters to about 6 millimeters. According to a preferred embodiment each of stripes 22 has narrower regions along its length, which facilitates detachment.

According to one embodiment of the invention, and as specifically shown in FIGS. 1a–b, stripes 22 are substantially linear stripes. However, according to a presently preferred embodiment of the present invention, as specifically shown in FIGS. 2a–b, each of stripes 22 follows a wave (e.g., sinusoidal, broken line) pattern to form closed cells when crossing or tangent to one another. This is the preferred configuration because cracks in constructions are typically progressing in, or following, linear paths. Therefore, selecting stripes 22 to follow a non-linear wave pattern ensures that crack induces shearing forces will less likely encounter a totally bonded region, which is more prone to tearing. The term "wave pattern" as used herein refers to any non-linear pattern, i.e., which does not include linear stripes or fractions thereof.

Figure 5:
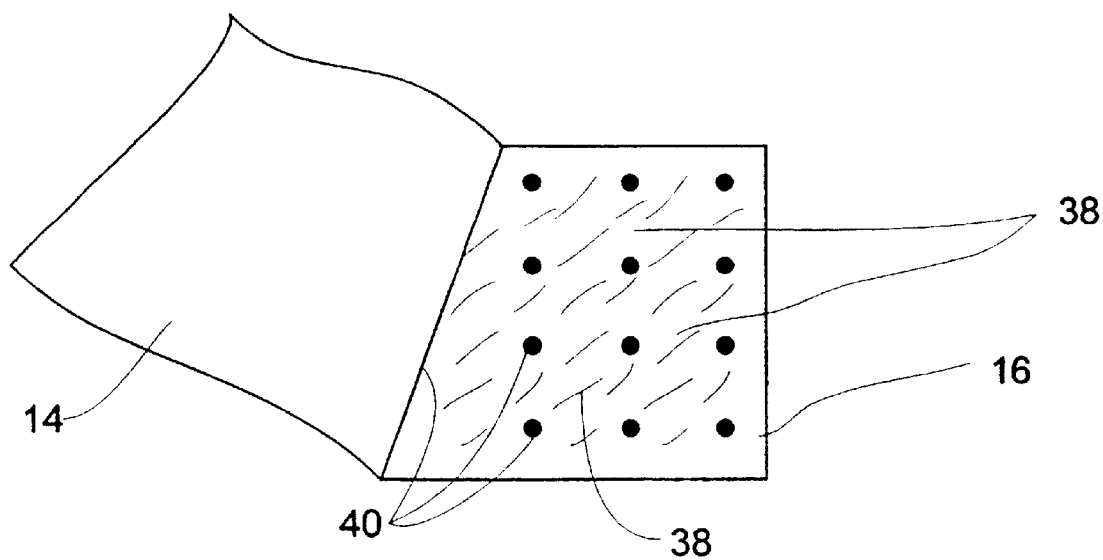
FIG. 5 is a top view of another preferred embodiment of the sealing sheet assembly according to the first aspect of the present invention.

According to another embodiment of the present invention upper layer 14 and lower flexible layer 16 are substantially fully attached to one another via a week attachment 38 (shown in FIG. 5) across their surfaces. Attachment 38 is selected weak such that an ability of lower flexible layer 16 of transmitting forces acting thereupon by construction 12 onto layer 14 is reduced. In this case, upper layer 14 and lower flexible layer 16 are preferably further attached to one another sporadically via a stronger attachment 40 (shown in FIG. 5). Stronger attachments 40 are deployed to protect separation of layers 14 and 16 by strong winds (e.g., tornado). Weak attachment 38 is preferably selected having a breaking strength 80%, preferably 90% or more, lower than the breaking strength of upper layer 14. Stronger attachment 40 is preferably selected having a breaking strength 40%, preferably 70%, lower than the breaking strength of upper layer 14.

According to one embodiment weak attachment 38 is effected by weak welding or the use of a weak, preferably water repellent, adhesive, e-g., adhesives weakened using a heavy dose of inert fillers (e.g., FILLITE cenosphere or dolomite) and adhesive (non-hardening) pastes, such as, bunot limited to petroleum (VASELINE), silicone gel, wax containing compositions and bitumens.

According to another embodiment stronger attachment 40 is effected by stronger welding or the use of a stronger adhesive, e.g., see a list of preferred adhesives below.

Attachments 40 are sporadic and are spaced from one another up to about 10 centimeters, preferably about 1 centimeter. The area covered by each attachment 40 is preferably less than about 0.7 square centimeters, preferably within the range of 2–70 square millimeters. Typically the combined area covered by attachments 40 is ranging optimally between 0.1% and 2% of the total area of sealing sheet assembly 10.

According to still another preferred embodiment of the present invention, as specifically shown in FIGS. 1a and 2a, upper layer 14 includes a reinforcing structure 24 (e.g., various woven and non-woven cloths, screens, gauze or free fibers made of, for example, polyester, glass, polyamide, nylon and carbon fibers) embedded therein. Embedding a reinforcing structure in seating sheets is well accepted in the art and serves for raising the tensile, breaking and tear resistance strengths and limiting or preventing shrinkage of the sheet.

As specifically shown in FIG. 1a, according to yet another preferred embodiment of the present invention reinforcing structure 24 protrudes from a lower surface 25 of upper layer 14 to form ridges 27 thereon which serve for effecting a partial attachment between layers 14 and 16, and the formation of closed cells 18 therebetween.

According to still another preferred embodiment of the present invention lower surface 25 of upper layer 14 or an upper surface 29 of lower layer 16 is formed with ridges 31 which serve for effecting the partial attachment of the layers and the formation of closed cells therebetween.

Protruding ridges are presently preferred because such ridges facilitate the process of applying an adhesive in crossing or tangential stripes.

Thus, according to still another preferred embodiment of the present invention attaching upper layer 14 and lower flexible layer 16 to one another to form closed cells 18 therebetween is effected via an adhesive.

Wherever adhesive is applied it may be transiently protected via a released film until used for attaching the layers, especially if roiled The attachment formed between layers 14 and 16 is preferably selected capable of at least 200%, preferably at least 300% or more elongation when settled, in either elastic or plastic fashion.

As already mentioned, according to a preferred embodiment of the present invention lower layer 16 is preferably selected capable of elongation, it is preferably elastic.

It is well known that elongating (e.g., elastic) substances tend the shrink in thickness when elongated. Thus, when tensile or shear forces cause elongation of lower layer 16 or of the attachment formed between the layers, they may detach from one another.

It is further known that upon elongation adhesive films loose some of their adhesive power. This well documented phenomenon also contributes to the process of layers detachment as described in embodiments where the attachment between the layers is effected by an adhesive.

Preferred adhesives according to the present invention are those based on self-adhesive acrylics, used at 100–300 grams per square meter, adhesives based on polyurethane, hot-melt thermoplastic adhesives which are applied at a temperature of about 180° C.–250° C. with pressure, ethylene butyl acrylate (EBA) copolymers based for deep freeze hot-melt adhesive (HMA), hot-melt thermoplastic adhesives, e.g., based on ethylene copolymers, propylene copolymers, polyvinylesters, polyamides, EPDM, polyvinyl acetates, acrylic resins and mixtures thereof. Preferred adhesives are those based on ethylene copolymers, particularly ethylene-vinyl acetate (EVA) copolymers and ethylene butyl acrylate (EBA) copolymers and pressure sensitive contact rubbers.

If layer 14 is selected to be bitumen or polymer modified bitumen (e.g., SBS or APP), an adhesiveness effect may be formed by applying a fast evaporating solvent of bitumen or modified bitumen onto layers 14 and/or 16, and by pressing together and optionally concurrently heating layers 14 and/or 16. Applying the solvent, press and heat may be effected by a printing machine (e.g., offset) or a lamination machine supplemented with an solvent feeding roll. Suitable bitumen solvents include, for example, trichloroethane (TCL), a mix of trichloroethane with SBS or APP (e.g., 90/10 or 85/15: VN), and toluene. Heat applied is preferably in the range of 50–80° C. to ensure quick evaporation of the solvent. Adhesiveness results due to the interaction of the solvent and the bitumen.

Applying an adhesive in stripes to either layer 16 and/or layer 14 may be effected via a lamination machine supplemented with an adhesive feeding roll, or a printing machine (e.g., an offset machine). However, according to a preferred embodiment the adhesive is a thermoplastic adhesive screen 26, shown alone in FIG. 4, wherein attaching is effected by a heat source e.g., lamination machine, electrical heat source or a direct flame.

Suitable adhesives include, but are not limited to, ethylene copolymers, propylene copolymers, polyvinylesters, polyamides, EPDM, polyvinyl acetates, acrylic resins and mixtures thereof. Preferred adhesives are those based on ethylene copolymers, particularly ethylene-vinyl acetate (EVA) copolymers and ethylene butyl acrylate (EBA) copolymers based for deep freeze HMA specially low temperature climates, to ensure superior flexibility and pressure sensitive contact rubbers.

According to still another preferred embodiment of the present invention first and/or second substances, of which upper and lower flexible layers 14 and 16 are made of, respectively, are thermoplastic materials, hence, attaching upper layer 14 and lower flexible layer 16 to one another, e.g., to form closed cells 18 therebetween, is effected via welding. Welding may be effected by heat applied via any heating device, including, but not limited to, hot air, direct flame, a high frequency machine, or laser seam, all as well known in the art.

As best seen in FIG. 1b, according to another preferred embodiment of the present invention sealing sheet assembly 10 further includes a cloth material 32 attached underneath lower flexible layer 16. Cloth material 32 is preferably partially embedded within layer 16. Cloth material 32 serves as a backing and effects better bonding of assembly 10 to construction surface 12. Cloth material 32 may be, for example, a woven or non-woven material made of wool or cotton, or a non-woven polyester fleece, etc. Material 32 also protects assembly 10, should the method of its bonding to construction 12 involves applying a layer of hot asphalt onto construction 12, which serves as an adhesive, and bonding assembly 10 thereon by laying and pressing.

As best seen in FIGS. 1a and 2a, according to another preferred embodiment of the present invention sealing sheet assembly 10 further includes a laminate 36 placed between upper 14 and under 16 flexible layers. Laminate 36 serves for restricting migration of plasticizers from upper layer 14 to lower flexible layer 16. Laminate 36 is preferably made of polyurethane.

According to one embodiment, and as specifically shown in FIG. 1a, laminate 36 is substantially fully attached to upper layer 14, whereby closed cells 18 are formed between laminate 36 and lower flexible layer 16. However, according to an alternative embodiment, laminate 36 is substantially fully attached to lower flexible layer 16, whereby closed cells 18 are formed between laminate 36 and upper layer 14. Both these options are illustrated in FIG. 3. Still alternatively, closed cells 18 are formed on both sides of laminate 36. In other words, the attachment of laminate 36 both to layer 14 and to layer 16 is selected such that closed cells 18 are formed therebetween. Preferably close cells 18 fobetween laminate 36 and layer 14 are partially overlapping with closed cells 18 formed between laminate 36 and layer 16.

According to a preferred embodiment, an additional, local, bonding strips located inside the closed cell areas is used to limit the distance between the surrounding bonding zones. There are 3 major factors which should be accounted for when designing the size of the closed cells:

A first reason to limit the area of the closed cell is to prevent development of a local curved bubble-shaped of the upper layer as a result of wind elevation forces. High angle of the curved upper layer may adversely result in peeling of the bonding strips. The dimension of the closed cells should be planned considering expected wind elevation forces, and considering stiffness, plasticity or elasticity of the upper layer which is exposed to these forces, to prevent the possibility of development of highly curved bubble between the upper layer and the lower layer. Obviously, most of the negative pressure created by wind, will be compensated by vacuum negative forces that will be developed between the layers as a result of missing gas between the upper and the lower layer, inside the closed cells. The vacuum present between the layers inside the closed cell works as an attachment and supports vacuum forces as a reaction to elevating forces of external wind. Gas can not penetrate from any direction during wind lift up action, as happens in the state of art free floating membranes or as occurs as a result of the large volume of air inside the geotechnical thick felt backing adhered to conventional sealing sheets. Very high vacuum attachment forces act efficiently to prevent wind elevation. This effect—enables a drastic reduction in the total area of the bonding strips (welded or adhered) and the bonding strength of those strips in order to energise the detachment along the narrow bonding strips. Therefore, large optimal area values of each cell, e.g., less than 100 cm² are suggested in locations where only low-speed winds and no traffic activity upon the roof ate expected. whereas. In some cases, the area of each of the closed cells can be even bigger, combined with as few as 1–15% total bonding strips area as compared to the total area of the sealing unit.

A second reason for limiting the size of the closed cells is to prevent damage to the bonding as a result of traffic activities above the sealing unit. Therefore, for regular roofing purposes smaller cells areas in which the larger width of the closed cell will be substantially smaller than the frontal width of a human foot, say no more than 25 mm, preferably, no more than 15 mm, optimally, about 7–13 mm.

The third reason for limiting the size of the closed cell is to prevent from too large area being flooded by fluid in between the upper and lower layers.

According to another preferred embodiment of the invention the second substance, of which lower flexible layer 16 is made, is selected such that lower flexible layer 16 restricts migration of plasticizers from upper layer 14 to construction surface 12. In this case lower flexible layer 16 is preferably made of polyurethane.

According to yet another preferred embodiment of the present invention lower flexible layer 16 is a foamed substance, such as, but not limited to, vulcanized foam rubber, foamed: ethylene propylene diene monomer, polyolefins, cross-linked polyolefins, low-density polyethylene, very low density polyethylene, Metallocen®, ethylene vinyl acetate either cross-linked or not, plasticized PVC, adapted linear polyethylenes, and other elastic compressibly deformable and regenerateable foamed thermoplastics. As detailed to a great degree in IL Pat. application No. 122095 to Heifetz et al., which is incorporated by reference as if fully set forth herein, providing under layer 16 as a foamed substance ensures lesser transmittance of forces between layers 16 and 14.

Due to its construction as hereinabove described, sealing cover assembly 10 according to the present invention is less affected by construction movements, as compared with prior art covers. When a crack forms in the construction surface tensile forces act upon the lower layer. However, due to materials selection and their specific properties, these forces are substantially blocked from arriving and acting upon the upper layer, as they are directed to separate or detach the layers. As a result, the tendency of the upper layer to break due to the tensile forces is remarkably reduced.

Yet, at the same time, due to the attachment between the layers, even if a tear should occur in the upper layer, substantial flooding is not expected due to the complete weak attachment or the closed cells formation.

It will be appreciated by one ordinarily skilled in the art that a plurality of lower layers attached to one another as described herein with respect to the attachment between the lower and upper layers, wherein the most upper layer of In this case, if the attachment is selected to include closed cells formation, their arrangement is preferably selected such that cells present between given layers are partially overlapping with cells present between other layers.

Further according to the present invention provided is a method of sealing a construction surface. The method includes the following steps. First a sealing sheet according to any of the above described embodiments is prepared. Second, the sealing sheet is bonded via its lower flexible layer (or the cloth material attached underneath thereto) using suitable attachment (e.g., adhesive) to the construction surface.

The sealing sheet assembly and the above method are useful in sealing any type of surface of any type of construction including, but not limited to, walls, roofs, underground foundations, underground constructions, containers, tankers, boats, submarines, aircrafts, spacecrafts, and the like.

Further according to the present invention provided is a method of preparing a sealing sheet assembly. The method includes the following steps. First components required for preparing the sealing sheet assembly according to any of the above described embodiments are assembled. Second, the components are attached to one another according to any of the above embodiments.

According to another aspect of the present invention, as illustrated and demonstrated in FIGS. 6–19 of the drawings, there is provided a multi-layer unit for sealing a surface of a construction, including, but not limited to, buildings, fluid reservoirs, containers constructional components, cabines and walls, including uses in civil ingeeniring, e.g., tubes, pypes, fluid storage tanks, gazolin tanks, pressure tanks, vehicles, aircrafts and seacrafts and all sorts of cabins which are under inertial stresses—hydrostatic stresses, gravity stresses, etc.

According to a preferred embodiment of the present invention, the multi-layer unit is designated for being bonded onto a surface of a construction and thereby sealing the surface of the construction and comprising (a) an upper sealing flexible layer having at least it's outer part protected against chemical and physical environmental influence; and (b) a lower layer bonded to the upper layer, the lower layer being elastic, closed cell, foamed polymeric material having a module of elasticity significantly lower than that of the upper layer and having tensile strength significantly lower than that of the upper layer, the material having an elongation at break of at least 25% in a designated temperature range, and a gas volume in a range of 65% to 99% of it's total volume. Alternatively, the lower layer is a flexible plastic non-polymeric material, such as, but not limited to, bitumen, modified bitumen rubber, etc. Yet alternatively, the lower layer is a flexible elastic non-polymeric material. Wherein, if the upper layer is thermoplastic or thermosetic, and further wherein if the lower layer has a thickness of above about 2 mm, or if the upper layer is obitumen, then, the upper and lower layers are selected such that if the tensile strength of the upper layer, according to it's definition in ASTM Standard D-751, method A (which is incorporated by reference as if fully set forth herein), is expressed in units of Newton per 50 mm width, and the tensile strength of the lower layer, according to it's definition in Din Standard 53571 (which is incorporated by reference as if fully set forth herein), is expressed in units of Newton per 1 mm squared, then, the ratio between the tensile strength of the upper layer and the tensile strength of the lower layer is greater than 200, whereas, if the upper layer is thermoplastic or thermosetic, and further wherein if the lower layer has a thickness of below about 2 mm, then, the lower and upper layers are selected such that a ratio of the tensile strengths of the upper and lower layers, when expressed in the units, respectively, is greater than 1000.

Further provided is a method for sealing the surfaces by bonding (e.g., with adhesives such as modified bitumen adhesives including modified SBS adhesives, for example low viscosity Tixophalt of Shell company, hot-welding, bonding laminates, hot melt adhesives or bonding net-shaped laminates or one component orathan for outdoor installations the sealing unit) to the substrate or to a layer (or layers) bonded to the substrate and a method for manufacturing the unit by bonding the lower layer to the upper layer or by spraying or laminating the upper layer upon the lower layer. Bonding between the layers can be made by welding or with adhesives such as one component self adhered, fast curing for outdoor.

According to another preferred embodiment of the present invention there is provided a multi-layer unit for bonding onto a surface of a construction mainly a roof deck. According this embodiment of the present invention, the lower and upper layers are selected such that (i) if the tensile strengths of the upper layer according to it's the standard is below 70 kg to 5 cm, then the lower is selected having a density lower than 60 kg per cubic meter, preferably—less than 30 kg per cubic meter; (ii) if the tensile strength of the upper layer is below 170 kg to 5 cm, then the lower is selected having a density lower than 70 kg per cubic meter, preferably less than 40 kg per cubic meter ; (iii) if the tensile strength of the upper layer is below 250 kg to 5 cm, then the lower is selected having a density lower than 100 kg per cubic meter preferably less than 50 kg per cubic meter; (iv) if the tensile strength of the upper layer is 350–200 kg to 5 cm (mainly for civil engineering uses) then the lower is selected having a density lower than 160 kg per cubic meter preferably less than 50–70 kg per cubic meter; and (v) if the tensile strength of the upper layer is above 350 kg to 5 cm, then the lower is selected having a density lower than 350 kg per cubic meter. Those density values of the lower layer are for providing a better stress dampening mechanism, that will ensure detachment of the upper layer from the substrate wherever high stresses are transmitted as a result of movements of the substrate in the vicinity of cracks, spaces, fissures and expansion joints in the construction. The detachment will occur by rupture that will develop. through the cross section of the lower layer.

It will thus be realized that in the novel sealing and insulation unit the upper and lower layers serve different and complementary purposes. The foamed-cell structure of the lower layer adapts itself locally to movements developing in the vicinity of cracks and spaces in the construction it is attached, and while doing so will not, on its upper surface, transmit same strains to the upper layer. Should excessive tension be applied to the sealing unit, the lower layer may tear, but will not degrade the integrity of the upper layer. The lower layer is, for this reason, initially made of a weaker material. An advantage obtained by such choice is that such a material naturally is less costly. The closed-cell foamed structure, as is known, an excellent heat insulator, a quality in demand for energy efficient buildings. The upper layer provides the function of weather resistance, sealing and wear resistance, as far as required for roofing or for general sealing and surface coating. In roofing, in hot climates, the outer layer is advantageously provided with a IR reflective surface to reduce heat absorption. The outer layer thus protects not only the construction, the roof or the building, but also the lower layer.

The large selection and combinations of foamed polymeric materials facilitates enlarging the temperature range to be adapted to the specific environmental demands.

It is of interest to note that wherever there is a reference, in the present invention, to a foamed polymeric material in general, or to any specific foamed polymeric material, it is with the meaning of foamed, elastic, closed-cell, polymeric materials which are suitable for sealing along acceptable period in the specific chemical and physical (including thermal) sealing environment.

The closed-cell foaming serves few principal functions: to weaken the polymer, keeping the designated strength ratio to upper sheet tensile strength in order to build up a stop for the tear from running through the whole profile of the sealing sheet and to prevent harming of the main part of the sealing unit; to reduce the stiffness (the module of elasticity) (when applied with elastic polymers) of the lower layer, in order to reduce the level of tensile and shear stresses transmitted to the upper layer/sheet; to build up a low-cost thickness; to provide it's efficient regeneration (when applied with elastic polymers e.g., polyolefins, polyethylene, metalocen, ethylene vinyl acetate and others). Covering the substrate with a high thermal resistance conductive layer (even in a thickness of about 2 mm of the closed-cell lower layer) decreases the quantity of surface-cracks, which occur while having a sudden exposure to drastic changes in temperature. The lower layer works as a thermal blanket by lowering the rate of strain development, permitting the thermal energy in the outer part of the substrate to be absorbed by the inner parts of the substrate. Hence, cumulatively: less cracks will occur in the substrate. Another aspect of this effect is allowing more time to the polymeric material to express it's elongation ability by delaying thermal energy penetration. In case of a sudden drop in temperatures, lowering the speed of the shrinkage along the crack, enables, cumulatively, less damage to the polymeric material of the lower layer. A closed cell foamed polymer combined with elastic behaviour, characterised by the specially—very low module of elasticity and very good regeneration qualities. Therefore weakened membranes of this characteristics bonded with significantly stronger upper layer, provide improved sealing abilities of the whole the bonded sealing unit above substrate and above moving cracks and spaces. The optimal range (for most of the uses, mainly for roofing) of the total volume of the closed-cell cavities at the foamed lower layer, is about 88–98% of it's total volume.

Thickness together with elongation are two qualities that provide a sealing protection above space in a state of expansion. The closed cell provides very efficient configuration for having thickness. Only, where the lower layer has a significant elongation-ability—the shear stresses in the sheet-profile becomes significantly weakened as a function of the distance from the expanding cracked/moving substrate. I.e., the more the thickness of the lower layer—the less shearing stresses residues will arrive to it's upper part layer. The tensile forces that will develop in the upper layer are function of the residual shearing forces transferred from the lower layer. The tensile and shear stresses, created in the lower layer and transmitted to the upper layer, through the bonding between the layers, are significantly weakened as a function of the lower laymodule of elasticity. It is of interest to emphasize that these stresses are created as a result of the existence of the module of elasticity of the lower layer.

Hence, it is a principle of the present invention to limit the module and to achieve low values by lowering the density of the polymer in the total volume to the limits of the mechanical other required properties. By doing so, we shall gain: the maximal benefit provides by the elongation ability of the edges of the rupture occurred in the lower layer; enlarging the bridging ability of the whole the sealing unit, while the stresses transferred to the upper layer will be minimal.

Thus, it is of interest to note that a principal purpose of the present invention is to provide not only an economic solution to combine elongation with economic thickness, a fundamental principle of the present invention is to demonstrate the combination of an upper and lower layers in which the relative shear and tensile strengths between them—ensures, that the flexible upper sealing layer will remain unharmed as a sealing layer, carry on bridging above the moving, on extreme cracked and movements of substrate occasions. It is of purpose of the present invention to provide the upper layer with improved to bridging ability above moving cracks and spaces in conditions where same upper layer or upper sheet, by itself, is unable to give the same.

As broadly described, the tear resistance of membranes is not in a direct proportion to their thickness. Once there is a beginning of a tear, frequently, soon, a total breaking of the membrane profile will occur. Using the polymeric foamed elastic lower layer—with high elongation and weakened shear and tensile strengths, bonded to an upper stronger sheet—prove a new mechanical profile in which the large distance (lower layer thickness) of the upper sheet from the substrate ensures very efficient utilization of decreasing shear from being transferred to the upper sheet and not less important, to stop the tearing process along the normal direction of the profile, using the tear itself for providing better efficiency for the lower layer to express most of ifs elongation ability, while both edges of the tear (going far from each other) turn to provide an additional length for the bridging ability of the whole sealing unit and have the opportunity to express their most elongation ability along the hypotenuse direction (FIG. 6 AC) to compensate every growing in the crack width.

Figure 6:
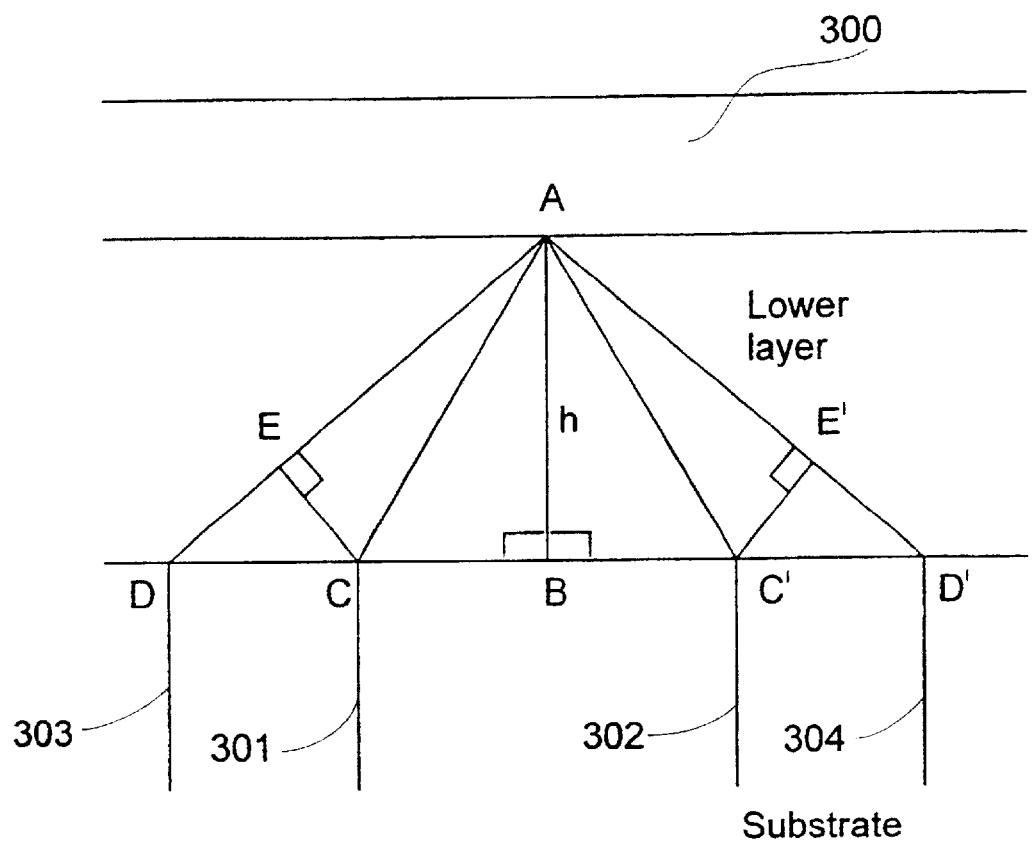
FIG. 6 is a scheme aimed at assisting in explaining the concept behind the second aspect of the present invention.

FIG. 6 shows a description of a rapture (schematic cross-section) in a bonded double layer sheet, the lower layer is bonded to an upper layer 300, and the upper layer tensile and shear strengths are significantly stronger than these of the lower layer and able to resist the tensile and shear stresses transferred by the lower layer. The reduction in lower layer thickness during the stretching is ignored.

It is of importance to demonstrate a geometrical proof for the improvement in efficiency of the elongation ability and hence the total bridging ability, caused by the tear crossing the elastic lower layer, in the specific configuration described in the present invention.

The crack 301–302 grows from CC' to DD', h is the foamed elastic lower layer thickness, AC and AC' are crack's edges at the initial situation and AD and AD' are the edges after the crack's growing 303–304. Assumption: the crack's growth is symmetric.

$90° > \alpha > \beta > 0°$
$\alpha - \beta > 0°$
$CB = h \cot \alpha \quad BD = h \cot \beta$ Half of the additional crack's width is:

$$DC = h \cot\beta - h \cot\alpha = h(\cot\beta - \cot\alpha) =$$
$$h\left(\frac{\cos\beta}{\sin\beta} - \frac{\cos\alpha}{\sin\alpha}\right) = h\left(\frac{\sin\alpha \cos\beta - \sin\beta \cos\alpha}{\sin\alpha \sin\beta}\right) = \frac{h \sin(\alpha-\beta)}{\sin\alpha \sin\beta}$$

$$AC = \frac{h}{\sin\alpha} \quad AD = \frac{h}{\sin\beta}$$

The additional length in crack's edge is:

$$AD - AC = \frac{h}{\sin\beta} - \frac{h}{\sin\alpha} = \frac{h(\sin\alpha - \sin\beta)}{\sin\alpha \sin\beta}$$

Now let's prove that the additional crack's edge is always smaller then the half of crack's growth, for every given h, $$\frac{h(\sin\alpha - \sin\beta)}{\sin\alpha \sin\beta} \overset{?}{<} \frac{h \sin(\alpha-\beta)}{\sin\alpha \sin\beta}; \quad : \frac{h}{\sin\alpha \sin\beta} > 0$$

$$\sin\alpha - \sin\beta \overset{?}{<} \sin(\alpha-\beta)$$

$$2 \sin\frac{\alpha-\beta}{2} \times \cos\alpha + \frac{\beta}{2} \overset{?}{<} 2 \sin\frac{\alpha-\beta}{2} \times \cos\alpha - \frac{\beta}{2};$$

$$: 2\sin\frac{\alpha-\beta}{2} > 0 \left(\text{since: } 90° > \frac{\alpha-\beta}{2} > 0°\right)$$

$$\cos\alpha + \frac{\beta}{2} < \cos\alpha - \frac{\beta}{2}$$

And that is true since $$\frac{\alpha+\beta}{2} > \frac{\alpha-\beta}{2}$$

and Cos, in the range of 0°–90° is a descending function, thus:

$$\cos\frac{\alpha+\beta}{2} < \cos\frac{\alpha-\beta}{2}.$$

That means that always the additional length in rupture's edge ED is smaller than half of crack's width growth.

The above proof shows an obvious advantage while using the combination of the lower and upper layers, providing profile structure that shows improvement caused by the rupture, with less elongation of the lower layer there is very efficient compensation of the crack's growth, for every additional growing in the crack width, the additional length of the edge is smaller and tensile stresses in the edge of the rupture—are decreased.

For example:

Suppose h is 4 mm, CB is ½ mm and DC is 0.5 mm. It means that the crack has grown from 1 mm to 2 mm, i.e. in 100%. Then:

$AD = (1^2 + 4^2)^{1/2} = (17)^{1/2}$,
$AC = ((½)^2 + 4^2)^{1/2} = (16.25)^{1/2}$
$AD - AC = (17)^{1/2} - (16.25)^{1/2} = 0.092$ mm.
While $DC = 0.5$ mm.

The following Table shows theoretical correlation between the thickness (mm) of the already ruptured lower layer and it's max' elongation ability related to the crack's width (mm), assuming that the rupture already exists, when crack's width is zero.

| elongation: | | | | | | | thickness (mm) |
|---|---|---|---|---|---|---|---|
| 400% | 300% | 200% | 100% | 50% | 30% | 15% | |
| 9.80 | 7.75 | 5.66 | 3.46 | 2.24 | 1.66 | 1.14 | 1 |
| 14.70 | 11.62 | 8.49 | 5.20 | 3.35 | 2.49 | 1.70 | 1.5 |
| 19.60 | 15.49 | 11.31 | 6.93 | 4.47 | 3.32 | 2.27 | 2 |
| 39.19 | 30.98 | 22.63 | 13.86 | 8.94 | 6.65 | 4.54 | 4 |
| 58.79 | 46.48 | 33.94 | 20.78 | 13.42 | 9.97 | 6.81 | 6 |

Theoretic bridging-upon-crack values (mm) of an already ruptured lower layer, calculated for different values of elongation and thickness. The bridging length before the rupture begun—is assumed to be zero. The elongation caused by the crack growth before the rupture begun—is assumed to be zero.

The Table above shows the efficiency revealed after the whole lower layer is ruptured: the needed growth in rupture edges, for every given growth in the crack, is dramatically lower in comparison to the elongation that was needed while the lower layer was unharmed. Higher thickness will provide reduction of needed elongation, meaning, better efficiency for same elongation ability of the lower layer.

For the same growth of crack's width, less elongation will be needed, the result is less tension developed in the edges of the rupture and its vicinity, meaning less additional stresses to be transferred to the upper layer. The same result is obtained by a reduction of the module of elasticity of the lower layer(s).

Of course, in reality, the tearing begins above varying cracwidths, depend on variable many factors, among them, only few are approximately known, others are not known and only an estimation can be made as for improving the design. The results in the following table demonstrate a strong tool for improving the bridging ability by using combinations of thickness and elongation qualities to overcome this problem of variable ranges of large crack's movements, to provide a much larger factor of safety.

There are two theoretic questions to emphasize, concerning the research of the connection between the crack width and the tear behaviour of the bonded sheet upon the crack. One is, in which crack widths the rupture/tear—will begin? and second, in which crack width the tear will cross the whole profile of the lower layer? The answers depend on many factors, among them the main ones are: membrane elongation ability at the specific aging; temperature and environmental conditions; adhesive strengths and elasticity; existing cracks and spaces width at the stage of applying the sheet on the substrate; surface texture of the substrate; the characteristics of the edges of crack movements (cyclical or continuous widening; combinations with vertical shear; various abrasion caused by crack's edges) creep and fatigue values of the specific polymer under the changing environmental conditions; meetings of cracks or spaces at junctions and many other factors.

The shear forces transferred to the lower layer in the vicinity of the crack are gathered within very large area. The closer we are to the rupture edges, the stronger are the shear and tensile forces. In the basic mentioned embodiment of the present invention, the ratio of tensile strengths between the lower layer and the upper layer (according to the different units definitions) ensures the appearing of the rupture through the lower layer profile, on an early stage, before the upper layer receives significant tensile stresses relating to it's tensile strength and to ensure the stop of the rupture to cross the upper layer and by that enables the thickness of the lower layer to express a significant bridging length provided by the rupture's edges going far from each other and to express a significant part of the edges elongation ability according to the efficient characteristic described above.

As the lower layer shear and tensile strengths are weaken compared to these of the upper sheet, as grater the parts of the additional bridging length and elongation—is provided. Of course, this correlation is true until we come to the point that the rupture edges already produced all of their elongation ability.

Now we come to a preferred embodiment of the invention, in which after the rupture already expressed all of its elongation ability, the tensile and shear strengths ratio of the layers, will ensure the survival of the upper layer, in this embodiment—the rupture will change it's direction and will begin tearing the lower layer in the shear direction—parallel to the upper surface of the sheet, usually on the very upper part of the lower layer. This shearing tear enables a higher bridging ability of the upper sheet. Usually, according to our tests, the upper layer will resist the stresses without harm in it's ability to seal, while this behaviour is happening when the ratio between tensile strength of the upper layer and tensile strength of the lower layer (According to the units definitions) is greater than about 2000 for a lower layer of a thickness lower than about 2 mm. The shearing forces on the lower layer are stronger as the thickness is lower. As higher the lower layer thickness the higher will be the minimal value of the ratio in order to ensure the shearing tear. The development of the tear in the shear direction depends on many variable factors in the materials and in the environmental physical and chemical conditions. The present embodiment offers an efficient tool to achieve the causing of the shear—direction—tear and most preferred is using the ratio of strengths together with reinforcing the upper layer by textile or fibres in order to candle the creep and to receive the tensile stresses of the upper layer under prolong stresses caused by the growth of the crack.

In another preferred embodiment of this aspect of the present invention the bonding between the upper layer and the lower layer is a pre designed zone prepared for excepting the tear in the shear direction and the bonding zone comprising an adhesive or welding configuration on a shape of a net, the holes in the net are not bonded, or almost not bonded, the firmly bonded areas, surrounding the holes are narrow enough to express releasing or even peeling due to the stretching activities and they are of a preferred width of about 0.3–4 mm and the holes (closed-cell) are of a preferred area of millimeters to few centimeters square. According to a most preferred configuration, the bonding strips surrounding the holes are waved, overlapping or crossing each other to prevent random accumulation of the forces that might develop along strait strips of bonding, forces which are characterized by the crack course. In a unique preferred embodiment the adhesive net is preferably made of a hot-melt adhesive laminate/film, as known in the prior art. There is a benefit when this adhesive layer is made of an elastic adhesive, because such an elastic adhesive will provide a better opportunity for an action of peeling to be developed for encourage the releasing of the bonding. Apparently, peeling will not always occur, but it seems that the angle created on the slope of the upper layer, caused by the shrinkage of the lower layer (as a result of the stretching demonstrated in FIG. 19) will cause a unique state of peeling that will encourage separation under low tensile forces. The adhesive net shape by itself "invites" peeling as a result of transferring forces, not only in front of the bonding stripes, but also passing behind the narrow bonding strips, with the help of a small momentum of rotation happening in between the lower and upper layer, possibly, with the help of the typical angle on the slope of the upper layer. The strength (cohesive strength) of this bonding, in most of the versions, is preferred to be significantly weaker than the breaking strength of the upper layer. But, when using the adhesive net shape embodiments, it is possible to use even adhesives having a cohesive strength higher than the breaking strength of the upper layer. Wherever the term "breaking strength" is used it refers to the tensile strength at break only in the normal direction of the membrane profile.

The partial bonding between the upper and lower layers having a net shape to create closed, not bonded areas, might be of any shape and size. This partial bonding optionally can be located between any number of lower layers, to provide this efficient detachment mechanism.

Typical embodiments having this shear-sensitive detachment mechanism are described above.

Alternatively, in order to create the closed-cell structure, welding is effected by two stages: in the first stage, a thin membrane is welded on the lower surface of the upper layer by using heat embossing machine having an adapted embossing drum designed to press the designated chosen shape of the strips on net-shape configuration, to create a partial welding in which the internal areas between the bonding strips will not be welded, wherein care is needed to ensure that the upper thick membrane surface will be heated to its welding temperature (sometimes with additional source of heat, e.g., infra-red element), whereas in the second stage this thin membrane is welded to the foamed polymeric lower layer, by flame on a way that the flame will be directed to melt the upper skin (surface) of the foamed layer only transferring less heat to the thin membrane in order to prevent excessive heat to be transferred through the thin membrane -to prevent welding in the internal closed-cell free areas (not bonded) that were created during the former stage.

It is essential to the direction and the location of the flame in order to ensure the prevention of welding in these areas and to adapt the location to the membrane motion speed to prevent excessive temperature.

In order to enlarge the working temperature ratio it is advised that the thickness of the thin partially welded membrane will be minimal, but high enough to detain the heat to rise up to a temperature that will create unwanted welding between the upper free surface of the thin membrane and the upper membrane. This thickness is preferably of about 40–80 microns. Preferably the thin membrane includes two plies (or more ) in which the surface to be partially welded to the upper layer has a significantly higher melting point—than the opposite surface, facing the foamed lower membrane, to thereby enable welding temperature between the foamed lower membrane and the thin membrane without spoiling the closed cells, free from bonding areas. The thin membrane is preferably made of elastic materials weldable and compatible with the above requirements. The melting differentiation between both faces can be achieved by adding lower melting point polymers, e.g., the thin membrane could be medium density polyethylene and its lower ply (surface) could be with 7% of EVA having a lower melting point. The elasticity of this membrane preferably should be high as, for example, 500% elongation to each direction in order to demonstrate the normal component of peeling of the welded strips from the upper layer as a result of its profile shrinkage caused by the growing tension caused by the widening tear in the profile of the foamed lower layer as a result of the widening crack in the construction substrate. The upper layer which forms the main sealing membrane could be made of any weldable TPO membrane e.g., polypropylene.

While the lower layer receives stresses from the substrate and transfers a part thereof across its profile, the strip configuration welding demonstrates a combined stress state in which a part of the thin membrane is welded and a part is not welded—to the upper layer and by that, its shrinkage provides a normal component which detaches the elastic thin membrane from the upper stiffer membrane (although the tension does not provide a peeling angle). The result is a discontinuity state that causes this normal peeling component. The same behaviour will happen, of course, also when the foamed lower layer is bonded: (adhered or welded) directly to the upper layer without an intermediate thin membrane. In order to insure this mechanism of detachment, the lower membrane should have a much lower modules of elasticity. The partially welded thin membrane could be made of any compatible material that might serve as described in this process.

In another preferred embodiment, the upper and the lower layers are bonded to each other with adhesive hot melt film having a net shape structure to create the closed cell bonding shape.

In another embodiment this upper layer is made of TPO membrane, e.g., polypropylene and the lower thin layer is made of polypropylene or any other polymeric material.

In another embodiment the upper layer is made of PVC and the adhesive between the layers comprises of material that has high resistance to plasticisers.

In another embodiments, all of the last 3 embodiment's adhesives serve to create the net shape strips as described above.

The minimal relevant elongation ability for the lower layer in the present invention is 25% of elongation ability at break, but practically, it is not offered, and it will be a risky approach to apply such low values of elongation, mainly because under decreasing temperatures most polymeric materials will show a significant reduction in the elongation and dull behaviour of bridging ability, the crack will cause a tear that will transfer higher shear and tensile forces to the upper layer and the stresses upon the upper layer will be concentrated on much smaller area (this phenomena will later be broadly described). Aging can also reduce elongation ability and a large safety range should be taken in order to provide durability of the improved bridging effect. The sealing products concerning with the present invention have to be applied in environments in which the range of temperatures is large, for instance: in roofing the range of a designated scaling sheet should serve, some times under climates changes of −30° C. to +70° C. Elongation ability of polymers depends upon temperature changes. Wherever a degree of elongation ability is mentioned, it is with the meaning of the elongation at room temperature. But, for a special embodiment designated for sealing under deep freeze conditions (where average environmental temperatures are less than −10° C.), wherever a degree of elongation ability is mentioned it is with the meaning of the elongation at the average specific environment temperature.

The combination of a significant elongation ability of the lower layer foamed material with mentioned structural and mechanical characteristics provides prolonging sealing durability upon cracked substrates or upon spaces between constructive elements as a result of the unique benefit of freedom (almost) of the upper sealing layer from tensile and shearing strains while being firmly bonded to a moving substrate upon small and medium cracks and spaces (prevalent on roofs) that are spread over the substrate. Providing a better elasticity, a lower module of elasticity and a lower ratio of strengths between the lower and upper layers will enable the bridging ability and improvement of the total sealing durability. upon tremendous movements nearby giant cracks. The general qualities of the elastic foamed the lower layer provides a better elastic absorption sheet (in comparison to conventional sheet) in the case of a penetrating impact on the upper sheet (the momentum is absorbed by the deflection which decreases the aggressiveness on the upper sheet).

The present invention is aimed at providing stress dampener and detachment mechanism which offers the improvement of stresses reduction and detachment over a substrate's zones characterized in violent movements, while still providing a fully firmly adhered state wherever the substrate is stable.

Doing so, the thickness of the foamed elastic lower layer provides another advantage of saving adhesive quantity between the whole combined membrane and the substrate (compared to a conventional adhered membrane). In the state of art adhered membranes—the adhesive should fill most of the entire volume between the membrane lower surface and the substrate's micro structure, in order to create full contact between the membrane and the adhesive layer. The high elasticity, combined with the low module of elasticity of the foamed lower layer enable exchanging quantities of adhesive with the volume of the lower layer by combining enough pressing upon the upper layer while applying the adhering. The lower layer should be pressed enough to ensure its penetration by using pressure during the process of adhering. In this stage, the adhesive preferably should provide enough "green" bonding strength in order to ensure that at the moment of pressing its bonding strength will be strong enough to bond the surface of the foamed lower layer to resist the low elastic regeneration forces of the lower layer to detach from the adhesive film. In this preferred embodiment there is an adjustment between the elastic regeneration forces of the lower layer and the bonding strength of the adhesive with the specific lower layer surface to provide enough bonding strength during the adhering process to ensure both surfaces bonding while the lower layer expressing its regeneration after being pressed with enough pressure to provide its penetration to the micro structure of the substrate to create full contact with a thin adhesive layer that were spread upon the substrate. In all the embodiments described in the present invention, the lower layer elasticity and regeneracharacteristic and its module of elasticity, combined with enough pressure—while being bonded with the pressure sensitive adhesive having the bonding strength—a significant adhesive quantity saving will be obtained.

Thus, according to this embodiment of the present invention there is provided a method of attaching a sealing unit to a surface of a construction featuring rough microstructure (say, the averaged distance between tops of ridges and bottoms of grooves is higher than about 0.3 mm), the method is for fluidproofing, say waterproofing, the construction. The method is effected by implementing the following method steps, in which, in a first step, a sealing unit is provided featuring an elastic, foamed, polymeric lower layer and an upper layer bonded thereto, the lower layer featuring a compression-deflection properties. In a second step, an adhesive is spread over the surface, the lower layer or both. In a third step, the sealing unit is placed over the surface such that the lower layer faces the surface. Whereas, in a fourth step, pressure is applied over the sealing unit. The compression-deflection properties of the lower layer and the pressure are selected such that the lower layer penetrates into the microstructure of the surface, to thereby form a substantially continuous contact therebetween, so as to improve bonding of the sealing unit to the surface, while reducing adhesive quantities required therefor.

Pressure is typically applied evenly using a press or roller, weighting preferably no more than about 300 kg and providing top pressure values of about 8 kg/cm². The compression-deflection properties are preferably selected such that when subjected to the above pressure, the volume of the lower layer is reduced by at least about 60%.

Another specific advantage of the present invention relates to the use of polyolefin sealing membrane (known in the state of art as "TPO") upon bituminous substrate which is popular on the roofs. For most of the polyolefin membranes it is not recommended to create a direct contact between the TPO membrane and the bitumen. The lower layer provides a separation and a low-cost bonding mechanism for applying TPO upon bituminous substrate. In this embodiment there is an upper layer made of polyolefin or of any other sealing material which is not compatible to be applied upon bituminous substrate having a foamed elastic lower layer with a module of elasticity significantly lower than the upper layer and this lower layer is capable of being in a direct contact with bituminous substrate, e.g., foamed polyethylene, with or without EVA, and this lower layer enable to provide chemical separation and mechanical protection between the membrane and a bituminous substrate.

It is of importance to clarify that wherever mentioned the terms "tensile" or "shear" strengths or both "tensile and shear strengths", it is with the meaning of the values of tensile forces according to the measurement conditions as detailed in the standards. It is also of importance to clarify that sealing and mainly reinforced sheet's tensile and shear strengths are expressed by units of force per unit of length of the same sheet. The unit definition is opposed to the common one in use for homogeneous materials. Tensile and shear strength are usually expressed by units of force per units of area. In the present invention the lower layer the strength is expressed by units related to area, while for the upper layer/sheet, always it is with the meaning of force per unit of length (even in the case that the upper sheet is made of homogeneous material with no reinforced layer inside the cross-section).

In especially preferred embodiment of the present invention for roofing in extreme cold climate regions, a multi-layer sealing and waterproof unit is provided wherein an upper conventional roofing sheet or membrane for extreme low temperatures, bonded to the lower layer, wherein the lower layer comprises cross-linked foamed elastic polymer, e.g., EVA, metalocen, VLDPE, PVC, or linear LDPE or cross-linked polyethylene with EVA or combinations of them. Optimal thickness of about 2–5 mm.

It is of interest to note, that with linear polyethylene and EVA it is possible to achieve satisfactory elastic properties, even under temperatures of about −40° C.

In a preferred embodiment for econornical, medium climates, massive-crack substrate, of the present invention, a multi-layer sealing and waterproof unit is provided, wherein the lower layer comprises cross-linked LD polyethylene with EVA foam having an elongation at break of about 100–400% and the upper sheet having a decreased thickness of about 0.4–0.9 mm and the lower layer comprising a high level of polymer (for strength compensation) with a density of about 350–100 kg/m³. In this embodiment, by giving a higher density foamed material we may reduce the thickness of the upper layer, when using the lower values of thickness for the upper layer/sheet, it becomes more essential to reinforce the upper sheet.

In a luxury preferred embodiment of the present invention, the multi layer sealing unit comprising of two of the foamed lower layer, in which the additional lower one is bonded to the upper one and intended to be bonded to the substrate. The additional lower layer is made of foamed elastic polymeric material, but it's module of elasticity is not limited and higher than that of the lower layer located in the middle part of the cross-section and the module of elasticity of the middle lower layer is of no more than 20% of that of the upper layer. This embodiment gives a better stiffness of the outer face of the sealing unit, to resist impact and improving the maintenance.

In another luxury preferred embodiment of the present invention there is provided a multi-layer, or at least triple-layer sealing unit, wherein two or more lowest layers are of a closed cell foamed polymeric material. In this version it is worthwhile that one of the foamed layers will have different mechanical or chemical properties, e. g., higher elongation; lower tensile strength, different thickness in accordance to cost considerations; thermal isolation values, different module of elasticity, etc.

Another luxury version of the above embodiment is to locate a bonded very high elongation laminate in between two the foamed layers. This version will have benefit of giving a second safety sealing layer that will survive a range after the lowest foamed layer had already damaged. In a variation of this version the laminate is located between the substrate and the lowest foamed layer to mechanically protect the weak layer lower surface, or to provide compatibility with certain adhesives. Another preferred embodiment of the present invention wherein the multi-layer unit is aimed to be bonded to a wall or upon internal face of a panel, inside a wall, to prevent fluid passing through expected cracks or spaces in the wall or the panel, as a fluid barrier from outside inside or vice versa. In a case where the unit is located inside a wall, well- protected, the thickness of the upper the flexible layer may reduce to minimal levels of e.g. 0.15–0.40 mm. The protection gives an opportunity to provide drastic reduction in the module of elasticity of the lower layer and to reduce density to very low levels, e.g., 15–25 kg/m$^3$, while the tensile strength of the upper layer may be reduced to very low levels, e.g. 25–40 kg/5 cm.

It will thus be realized that the novel unit of the present invention serves both as a sealing material and also, because of the thickness of its lower layer, makes substantial contribution to improving the thermal insulation of the surface to which it is applied.

It is of important to note that the sealing unit of the present invention can be covered, on it's external surface, by building materials, and can serve as a sealing layer under floor surfaces, while having an upper layer with a thickness above 0.8 mm. The upper layer can be applied separately as an emulsion, liquid or as an cured sealing sheet at the time of in factory and in site.

It is of important to not that all versions of the present invention, aimed to be apply upon hardening concrete, must be suitable to withstand alkaline attack. A typical effect of such an attack upon many elastomers is a decreasing in elongation ability.

Here it is also to be noted that the sealing unit of the present invention can be applied to vertical as well as horizontal surfaces. The references in this specification to upper and lower layers are used for convenience of description with reference to roof coatings, and are not intended to restrict the meaning to horizontal surfaces.

The sealing unit of the present invention is intended to be bonded to any substrate of a building, roofs, or a construction of a tank or container, a chamber for personal or for fluids, a pool, a seacraft or aircraft, gasoline or gas reservoirs, a space chamber including roofs and structures it is designed to protect. A suitable adhesive will bond to concrete or bitumen, and will bond to but not attack the resin of which the lower layer is composed As for any adhesive used in building applications, moderate cost is imperative. In especially preferred embodiment of the present invention, the lower layer is capable of compressive deformation of at least 70% and regeneration even after application of a local pressure of up to 20 kg/cm$^2$ for a few seconds. In this embodiment, the lower layer foamed material is in a density of about 350–200 kg/m$^3$. As more the density of the lower layer, as grater the pressure resistance. As will be realized, this spring-back feature of the lower layer which allows it to undergo compressive deformation and regeneration, i.e. after being compresses it returns to its original configuration without damage, constitutes a unique advantage of the present invention when compared with the more rigid foamed polymeric materials such as polystyrene and polyurethane mentioned above.

When choosing a lower layer material it should be noted that most polymeric materials having elongation properties of above 25% aren't suitable for utilization as the lower layer, due to their missing of other mentioned characteristics. In roofing, the minimal tensile shear strength of the lower layer, should overcome suction pressure applied by wind currents and stresses which can result from human activity thereon. For other sealing uses the minimal values of the strength should be designed according to the specific expected environmental and actions, including aging, as well known in the prior art sealing sheet. Most preferred polymers for the preferred embodiments of the present invention are wherein the lower layer comprises a member of a group consisting of foamed polyethylene, cross-linked polyethylene, low-density-polyethylene, very-low-density-polyethylene, linear copolymer, linear polyethylene, polyethylene-metalocen, ethylene-vinyl-acetate, metalocen, ethylene-propylene-diene-monomer, plasticized polyvinyl chloride and polyvinyl-chloride plasticized by solid copolymer plasticizer Elvaloy(r) manufactured by Dupont. In general, a part of the foamed olefins family will be easily suited, and other elastic thermosetic polymers and rubbers that might be economically foamed. In a preferred embodiment for the lower layer, the chosen polymer is cross-linked, usually the cross-link process cancels or reduces the creep and enhances tear resistance, as well known in the prior art.

When choosing an upper layer material it should be noted that the value of module of elasticity should be high enough to provide mechanical protection against human activities and for low values—a greater tensile and shear strength should be taken for the lower layer. For all the embodiments that are intended to be bonded to a substrate to be exposed to weathering and/or sun radiation for constructions, roofing, buildings, etc., ultra violet and weathering protections should be applied for the upper layer, aging protections should be applied according to the specific environment conditions, all according to the prior art know how or standards.

In a most common preferred embodiment of the present invention, the foamed material of the lower layer having a module of elasticity of no more than 50% of that of the upper sheet/layer, in order to ensure that even after the stage in which the lower layer is lengthened while being unharmed, even after occurring of the rupture in the lower layer, the lower layer will continue to provide not only the benefit of the distance of the upper layer from the level of the movements in the substrate, but also to provide the expressing of the elongation ability of the edges of the rupture and the elongation ability of the whole lower layer in the stressed vicinity of the crack in the stage in which the rupture already occurred, and by that—decreasing transmission of tensile stresses to the upper layer, also during the stage of the laceration.

In order for the lower layer to serve as an additional sealing layer, especially above the cracks, the layer may have elongation properties theoretically of at least 25%, practically—at least 40%, adapting to the common movements in the substrate.

Utilisation of foamed materials having low regeneration properties, may decrease the durability of the roofing sheets. If pressure is applied to such a sheet, a cavity is formed and liquids accumulate therein. Polluted liquids which contain chemical/biological substances may have a damaging effect on the upper layer. In the case of roof surfaces the amount of liquid aggregation containing sediments is proportional to the depth of the cavities. After evaporation the sediments within the dried-out cavities may adversely effect the sheets.

The desired regeneration of the present invention is accomplished by utilisation of materials such as cross-linked foamed polyethylene in combination with EVA in the lower layer. These materials can eliminate the formation of cavities greater than about 1 mm in depth, for a thickness of about 5 mm for the lower layer, although the density of the lower layer is very low (about 50–80 kg/m$^3$). When a pressure of up to 5 kg/cm$^2$ is applied (1–2 kg/cm$^2$ is typical for human weight), the sheet should return to at least 80–90% of the original volume. When even lower density foamed polymers are utilized or larger pressures are applied, or when the lower layer is compresses to less than 20% of the original volume, even though—very good regeneration results can be observed. It is of importance to verify that the chosen foamed polymer with the chosen density—for the lower layer will provide good regeneration properties under human expected activities upon the multi layer sheet.

Figure 7:
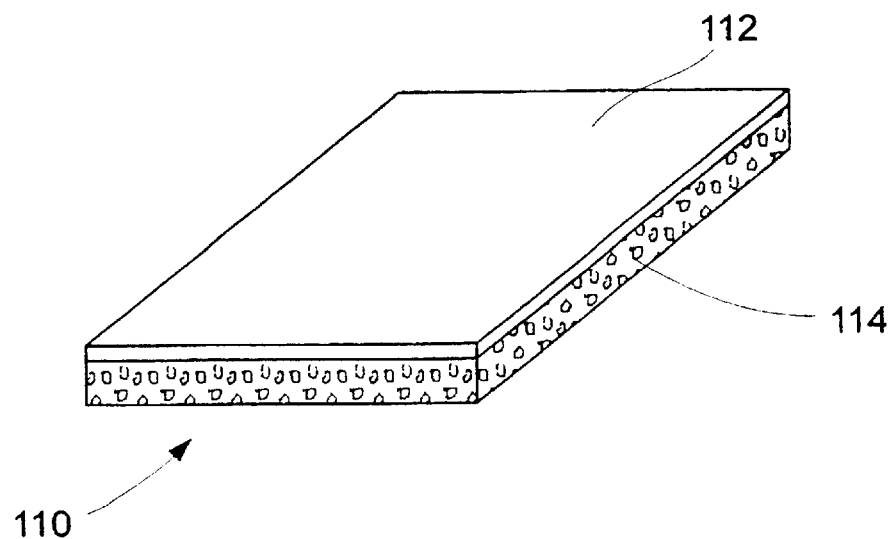
FIG. 7 is a perspective view of a preferred embodiment of a sealing unit according to the second aspect of the present invention.

There is seen in FIG. 7 a two-layer unit 110 for sealing buildings and constructional surfaces.

The upper layer comprises a waterproof flexible sheet 112 having a thickness of at least 0.6 mm preferably 0.9–1.5 mm.

Preferred suitable materials include the following: bitumen, e-g., 0.8–6, typically 3–6 millimetres thick sheet of modified bitumen which includes elastomers mixed with asphalt, e.g., polymer modified bitumen, such as, but not limited to, SBS (styrene-butadiene-styrene) or APP (atactic polypropylene), EPDM, Metallocen®, cross-linked polyolefin, styrene-butadiene-rubber based and acrylic based elastomers, polyethylene, LDPE, VLDPE, ethylene vinyl acetate, PVC, PVC formulated to retain plasticizers, polyvinyl-chloride plasticized by solid copolymer plasticizer Elvaloy® and flexible polyurethane. Here-mentioned materials and other polymers may be combined, and/or covered with an UV or IR radiation reflective paint or metallic film with low emissivity and/or reinforced by textile, screen and/or fibres as other polymers they might include common protectors and additives, e.g., for weathering, ozone, UV radiation, fungus etc. resistance, in order to improve their chemical and mechanical properties. Advantageously the upper layer 12 is reinforced combined with textile or screen.

The upper layer 112 is bonded to a lower layer 114 of elastic closed cell foamed polymeric material, wherein if the upper layer 112 is thermoplastic or thermosetic, and further wherein if the lower layer 114 has a thickness of above about 2 mm, or if the upper layer is of bitumen, then, the upper and lower layers are selected such that if the tensile strength of the upper layer, according to it's definition ASTM Standard D-751, method A, is expressed in units of Newton per 50 mm width, and the tensile strength of the lower layer, according to it's definition in Din Standard 53571, is expressed in units of Newton per 1 mm squared, then, the ratio between the tensile strength of the upper layer 12 and the tensile strength of the lower layer 14 is greater than 200, whereas, if the upper layer is thermoplastic or thermosetic, and further wherein if the lower layer has a thickness of below about 2 mm, then, the lower and upper layers are selected such that a ratio of the tensile strengths of the upper and lower layers, when expressed in the units, respectively, is greater than 1000.

In another bituminous embodiment the lower layer 114, can be made of bituminous material, e.g.: modified bituminous rubber, SBS modified bitumen, bitumen modified by various of latexes.

The foamed material has an elongation at break of at least 25%, practically—the minimal preferred value is 40%, at the relevant temperature (see a note). In the most common embodiment, layer 114 has a module of elasticity of no more than 20% of that of the upper layer. (better—with less).

In a preferred embodiment, thickness range of lower layer is 1.5 to 5 mm, wherein if the upper layer is thermoplastic or thermosetic, and further wherein if the lower layer has a thickness of above about 2 mm, or if the upper layer is of bitumen, then, the upper and lower layers are selected such that if the tensile strength of the upper layer, according to it's definition in ASTM Standard D-751, method A, is expressed in units of Newton per 50 mm width, and the tensile strength of the lower layer, according to it's definition in Din Standard 53571, is expressed in units of Newton per 1 mm squared, then, the ratio between the tensile strength of the upper layer and the tensile strength of the lower layer is greater than 400, preferably 800, whereas, if the upper layer is thermoplastic or thermosetic, and further wherein if the lower layer has a thickness of below about 2 mm, then, the lower and upper layers are selected such that a ratio of the tensile strengths of the upper and lower layers, when expressed in the units, respectively, is greater than 2000, preferably greater than 3000.

Figure 19A:
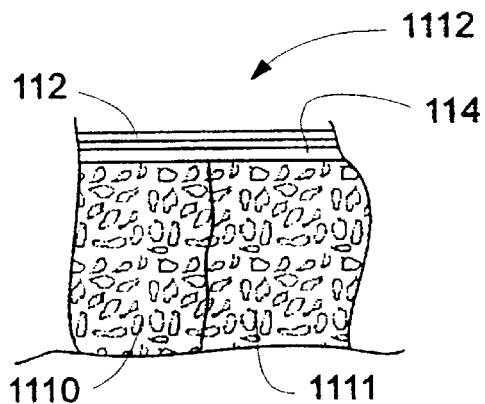
FIGS. 19a–c is a schematic cross section sketch of the unit's behaviour upon a crack according to the second aspect of the present invention.
Figure 19B:
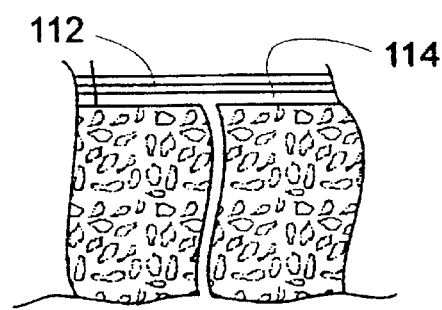
Figure 19C:
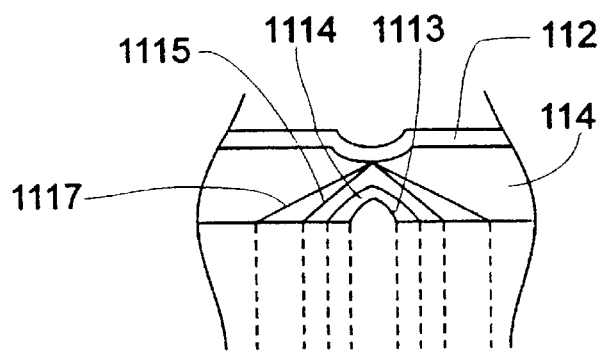

This increasing in the ratios is in order to provide a larger safety factor for the breaking of lower layer and to provide an early-breaking of the lower layer as to be broadly described in FIG. 19. As more the weaker lower layer 114 is thin, the more relative tensile and shear strengths should be weaken. When lower layer 114 is thicker than about 5 mm, the relative the strengths of the lower layer can raise up.

When in combination with modified bitumen, e.g., a 3–6 mm in thickness, the lower layer is preferably of 1.0–2.5 mm in thickness.

For roofing purposes the upper layer 112 has a thickness of at least 0.6 mm. But, wherever the sealing unit serves for sealing constructions under protected conditions, e.g., inside containers, tanks, internal face of a panel inside a wall etc. the thickness might be of at least 0.15, preferred 0.3 to 0.8. In a unique application of sealing containers under external or internal pressure, the upper layer 112 may include a super high strength textile or carbon fibers or steel—screen to provide high pressure resistance in case of a crack in the wall of the construction, and the strength of the foamed layer 114 might be increased relatively while keeping the ratio, by lowering the gas volume in the foaming process.

Most preferred embodiment for roofing for moderate climates is 0.8–1.3 mm thick, reinforced, flexible upper sheet having a tensile strength (mostly preferred) higher than about 90 Kg/50 mm width, weathering and UV highly protected, bonded to the lower layer (preferred) by welding or by outdoor adhesive such as one component outdoor orathan, hot-melt adhesive (HMA) EVA based, bonded, to a lower layer comprises: cross-linked low density closed cell polyethylene with EVA foam in the range 2–5 mm thick for the lower layer 114. The lower layer 114 does not require UV protection, having an elongation at break of above 200%, having tensile strength of less than 0.40 Newton per 1 mm squared (mostly preferred—less than about 0.30 Newton per 1 mm squared) and a gas volume of less than about 98% (to be designed in order to prevent wind elevation and traffic damages).

A special low cost embodiment demonstrates abrasion resistance variation, in which the sealing layer 112 is an integral reinforced part of the foamed elastic closed cell polymer 114 by a high strength dense textile or screen applied by heat or bonded or impregnated to the lower layer 114. On this embodiment we can not speak about thickness of the upper layer, and all the protecting additives and fillers are included in both layer. All versions of layer 14 may optionally include a self-adhesive, pressure sensitive, or hot-melt pressure sensitive layer, protected by a releasing material.

Other preferred suitable materials for the lower layer 114 include the following: vulcanized foam rubber, foamed: ethylene propylene diene monomer, polyolefins, -low-density polyethylene, very low density polyethylene, metallocen®, ethylene vinyl acetate, plasticized PVC, adapted linear polyethylenes, and other elastic compressibly deformable and regenerateable foamed plastics.

Particularly advantageous is the use of the same resin for both layers, for example an upper layer sheet of solid PVC in combination with a lower sheet of elastic foamed PVC with plasticizers to ensure elongation of the lower layer and a lower protecting film/laminate/barrier to prevent passage of plasticizer to the substrate.

A further preferred embodiment has an upper layer of polyethylene protected against ultra-violet radiation and weathering, and a lower layer of a cross-linked polyethylene.

Bonding of the upper and lower layers is carried out using any of many suitable adhesives, having service temperatures in the range −15° C. to 80° C. or 90° C. for roof application. Same adhesives and others having a service range of deep freeze temperatures, known in the prior art.

Preferred adhesives are those based on self-adhesive acrylics, used
100–300grams per square meter and adhesives based on polyurethane and hot-melt thermoplastic adhesive which are applied at a temperature of about 220° C.–250° C. with pressure and ethylene butyl acrylate (EBA) copolymers based for deep freeze HMA specially low temperature climates, to ensure superior flexibility.

Suitable for attaching the sealing unit to the substrate are hot-melt thermoplastic adhesives having a melting point slightly below that of the lower layer 114. Suitable thermoplastic adhesives known in the art which can be used herein include those based on ethylene copolymers, propylene copolymers, polyvinylesters, polyamides, EPDM, polyvinyl acetates, acrylic resins and mixtures thereof. Preferred adhesives are those based on ethylene copolymers, particularly ethylene-vinyl acetate (EVA) copolymers and ethylene butyl acrylate (EBA) copolymers based for deep freeze HMA extreme low temperature climates, to ensure superior flexibility.

With regard to the following Figures, similar numerals are used to designate similar components.

Figure 8:
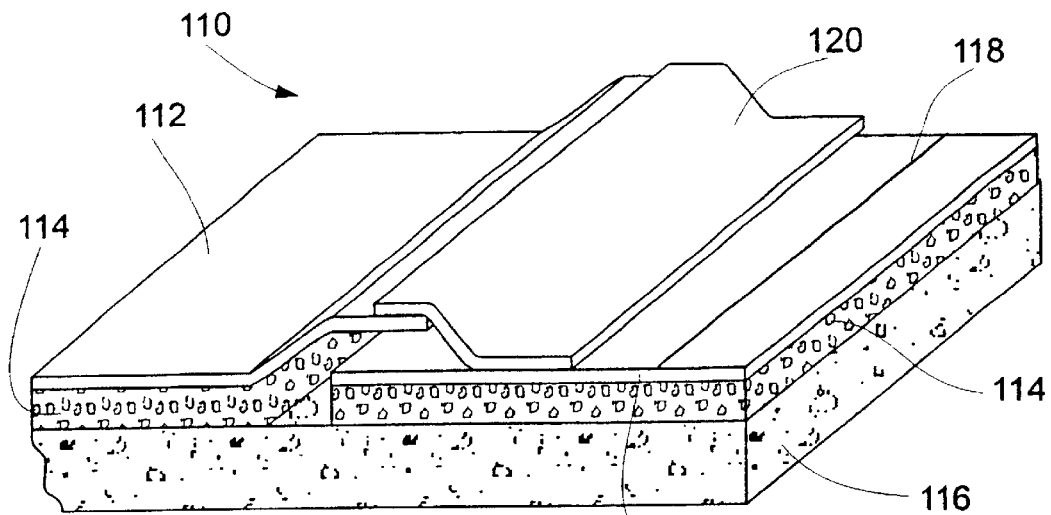
FIG. 8 is a perspective view of the unit according to the second aspect of the present invention applied to a building roof.

Referring now to FIG. 8, there is seen the same sealing unit 110, wherein lower layer 114 is bonded to a substrate surface 116 to be sealed. Bonding prevents curling up of the edges of the sealing unit 10, and prevents the accumulation of moisture between the sealing unit 10 and the building surface 116.

Joining of adjacent sheet is done using a lap joint 118, or by applying a 8–13 cm width weather-resistant bonded tape 120 at the edge of an overlap.

Figure 9:
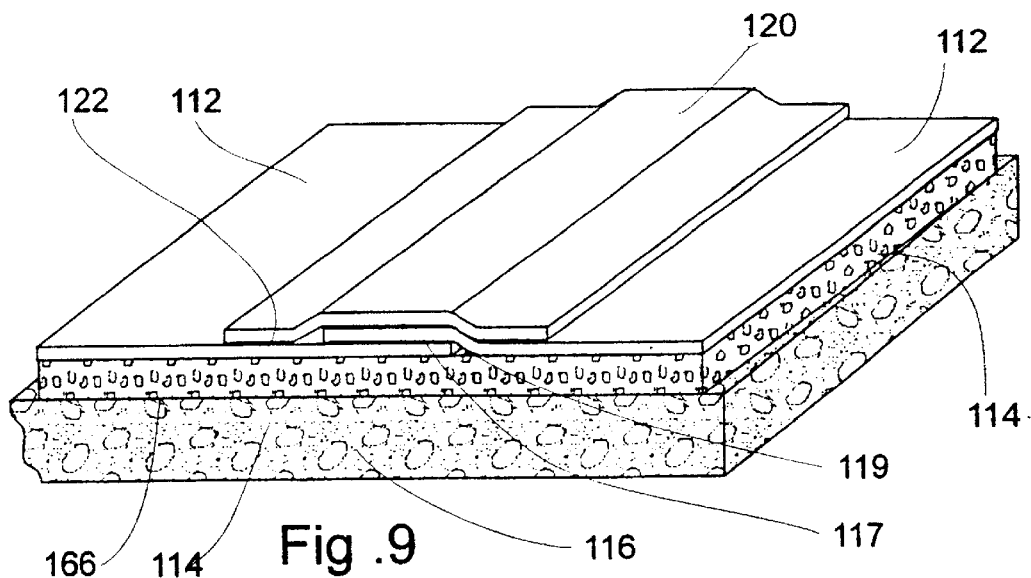
FIG. 9 is a perspective view of a preferred embodiment of overlapping between two sheets applied to a concrete substrate according to the second aspect of the present invention.

FIG. 9 demonstrates the same sealing unit 110, wherein lower layer 114 coated with self-adhesive pressure sensitive coat 166 is bonded to a surface of concrete 116 to be sealed. The upper layer 112 of one edge overlapping the upper layer of the adjacent sheet, using 3–6 cm width lap with pressure sensitive or hot air welding 117. The joint 119—area overlap covered with 8–13 cm width weather resistant bonded tape 120 bonded 122 to upper layers 112.

Figure 11:
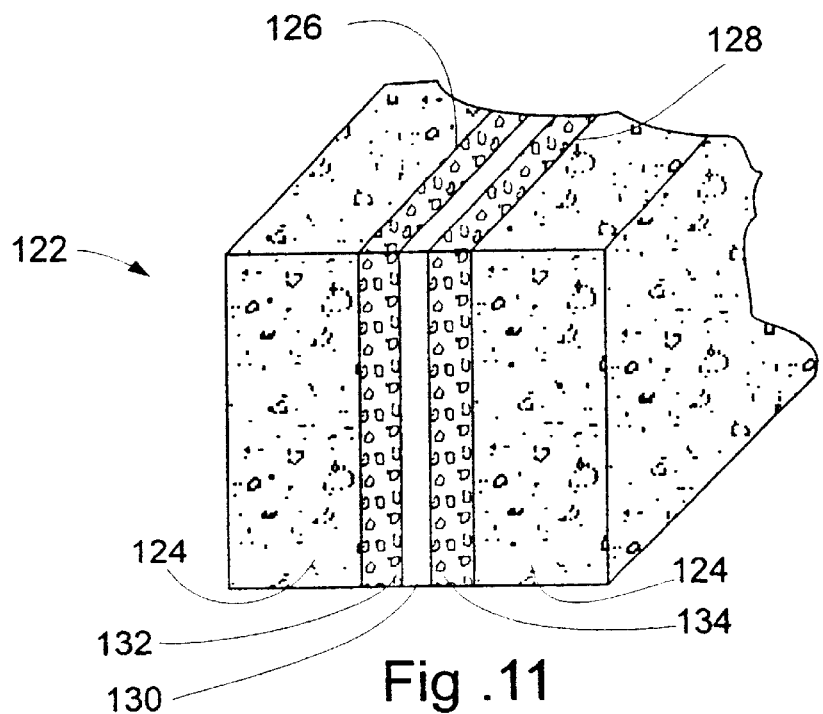
FIG. 11 is a perspective view of a triple layer unit used in horizontal or vertical planes according to the second aspect of the present invention.

FIG. 11 illustrates a triple layer sealing unit 122. When not-horizontally applied, but can be applied alternatively in the horizontal. The unit 122 is bonded to concrete surface 124 primed before bonding by a primer adapted to the specific adhesive on one of its outer faces 126, 128. A central sheet 130 comprises a sealing/waterproof flexible sheet having a thickness of at least 0.6 mm, which is bonded on each side to a layer 132, 134 of an elastic closed cell foamed polymeric material. The foamed material 132, 134 has a maximum tensile strength that enables keeping the strengths ratio greater than 300, relating to the central sheet 30, preferred greater than 1000 and an elongation at break of at least 40%, preferred above 200%, with compression deflection adapted to the expected pressure while applying the concrete and caused by the construction weight, the unit can serve also for the use of sound and vibration dampeners and for additional thermal insulation inside a wall or a roof and under a building foundation as a sealing unit with additional shock dampener unit.

The unit 122 is suitable for use as a vertical or horizontal moisture barrier. Element 124 can be in one side a concrete and on the other side—any other building material, e.g., sand, mortar, etc. and for the use of sealing a ceiling serves for vehicles parking or traffic.

Figure 10:
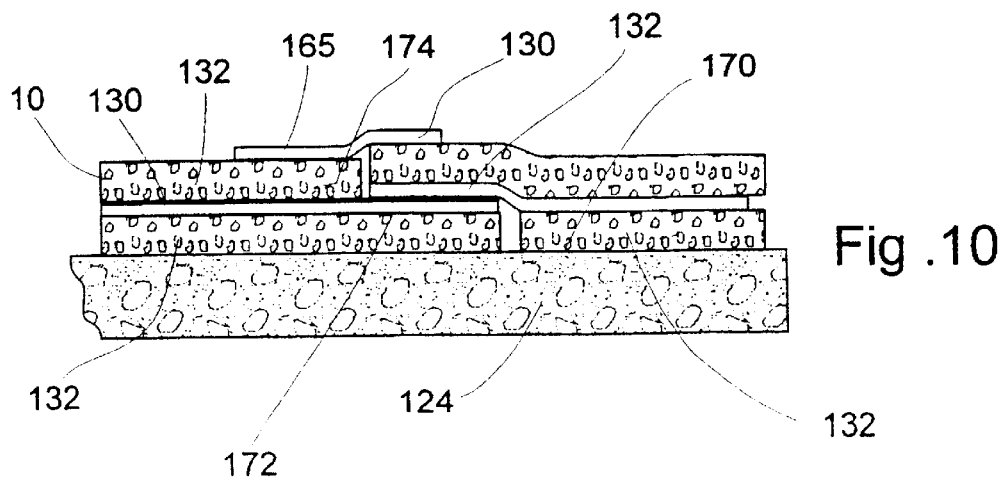
FIG. 10 is a cross-section of a preferred embodiment of overlapping of a triple layer unit used in horizontal or vertical planes according to the second aspect of the present invention.

FIG. 10 demonstrate the same sealing unit 122 wherein lower layer 132 is coated with self-adhesive pressure sensitive coat 170 and bonded to a concrete substrate 124. A central sheet 130 comprises a sealing flexible sheet of one edge overlapping and bonded 172 upon a central sheet 130 of the adjacent sheet, using 3–6 cm width lap with pressure sensitive or hot welding 172, while both edges are missing the lower foamed layer 132 on the lapping zone. The joint area covered with 5–13 cm width bonded 165 tape 174.

Figure 12:
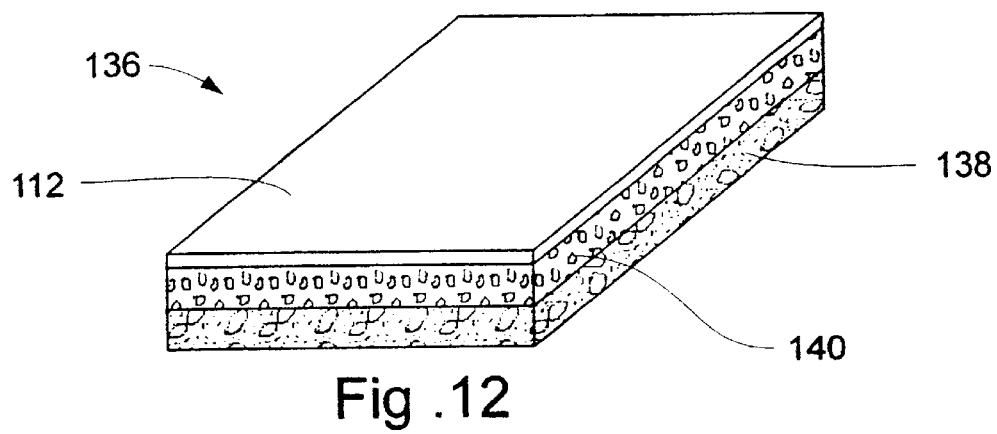
FIG. 12 is a perspective view of a triple layer unit configured to accept major building fissures according to the second aspect of the present invention.
Figure 13:
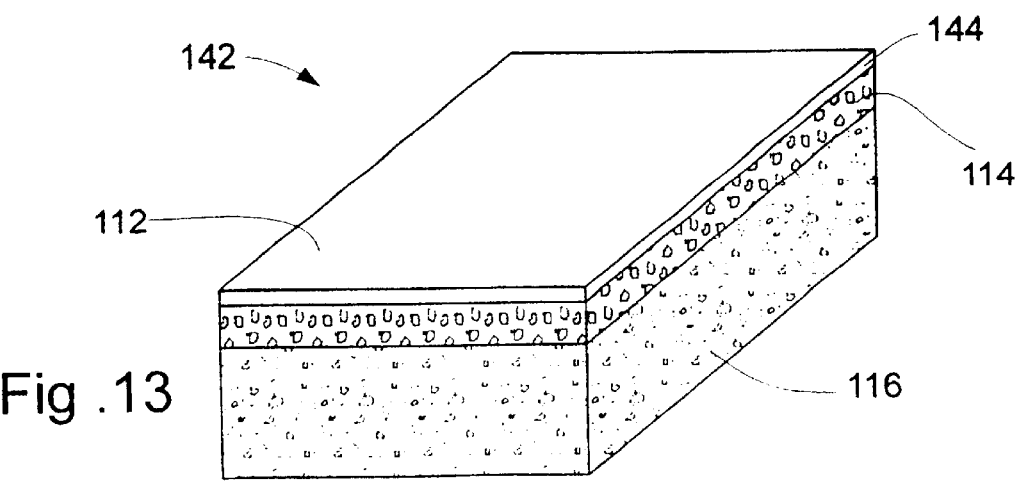
FIG. 13 is a perspective view of an embodiment including a barrier foil according to the second aspect of the present invention.

FIG. 12 illustrates a further embodiment of a triple-layer sealing unit 136.

The two lowest layers 138, 140 are of a closed cell foamed elastic polymeric material. At least one of the two lower layers 138, 140 is much stronger and ratio between the tensile strength of the upper layer 112 to one of the lower layers' the tensile strength is much lower, in order to provide larger safety factor for the breaking of the lower layer. In a preferred embodiment this here mentioned ratio can be greater than only 200. As more the here-mentioned weaker lower layer is thin, the more relative tensile and shear strengths should be weaken. While having two or more lower layers, it's better to adapt an embodiment of a profile, in which the stronger one locates on the lowest part of the profile—providing better protection. Whichever of the lower layers is uppermost, the stronger or the weaker, stresses which might damage the upper layer 112 are dissipated in the weaker of the two lower layers.

The upper layer 112 is a solid waterproof sheet at least 0.6 mm thick, as described with reference to FIG. 7.

The unit 136 is suitable for roof applications where the future development of large fissures is anticipated.

Seen in FIG. 12 is a sealing unit 142, similar to the unit 110 described with reference to FIG. 7, but further including a thin film e.g., metal foil 144 between upper 112 and lower layer 114. Both layers 112, 114 are bonded to the foil 144, which serves as a barrier to fire, plasticizers (if exist) transfer from the upper layer, solvents, moisture and gases. Where the upper sheet is made of PVC, the foil 144 prevents migration of plasticizers to the lower layer.

In a further embodiment (not shown) the barrier foil is below the lowest layer and is bonded to the substrate to prevent oils released by a substrate surface covered by bitumen, from reaching the lower layer, and from plasticizers in the lower layer from migrating into the substrate surface.

The barrier film/metal foil 144 can be similarly used in the triple-layer unit 136 described with reference to FIG. 12.

Figure 14:
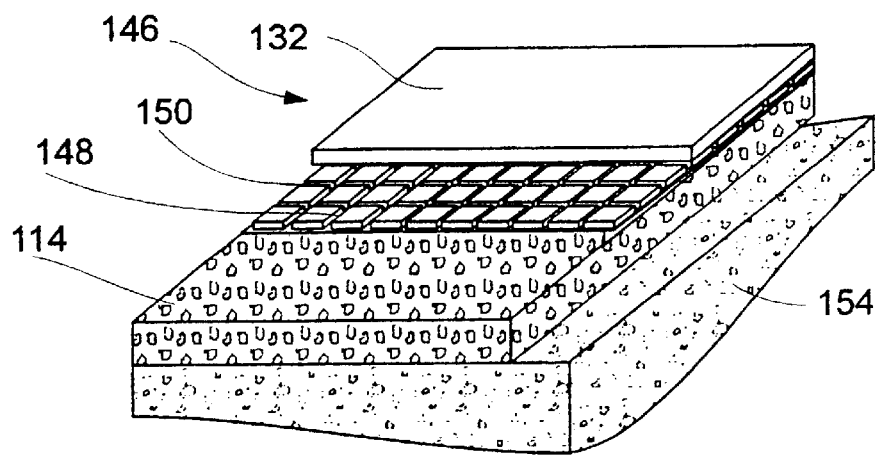
FIG. 14 is a perspective view of an embodiment having netting-reinforced upper layer according to the second aspect of the present invention.

Referring now to FIG. 14, there is depicted a sealing unit 146 further including a reinforcing netting sheet 148 bonded into the lower face 150 of the upper layer 152. The netting 148 dissipates stresses transferred from the substrate 154 through the lower layer 114.

Figure 15:
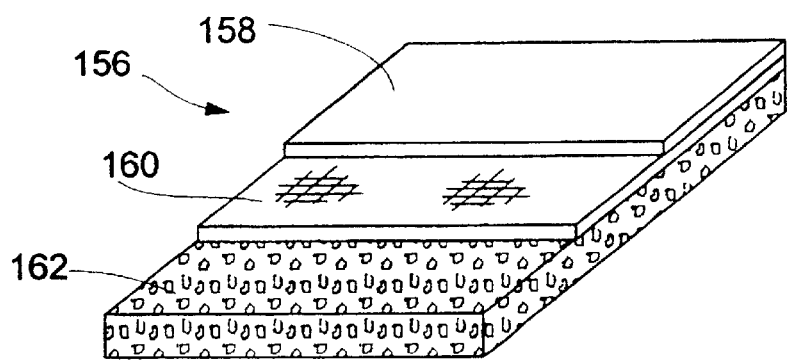
FIG. 15 is a perspective view of an embodiment having a textile sheet reinforced upper layer according to the second aspect of the present invention.

FIG. 15 shows a sealing unit 156, wherein upper layer 158 is reinforced by a textile sheet 160.

The textile sheet 160 dissipates stresses transferred through the lower layer 162.

Figure 16:
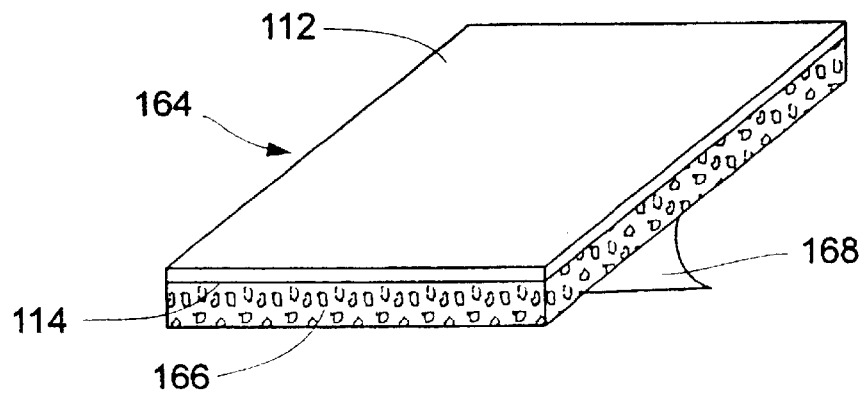
FIG. 16 is a perspective view of an embodiment having pre-applied adhesive according to the second aspect of the present invention.

FIG. 16 illustrates a sealing unit 164 similar to 110 described with reference to FIG. 7, but further including an adhesive-coated pressure-sensitive lower surface 166 for direct application to a substrate. The adhesive surface 166 is protected by a silicone-coated release agent 167 applied upon the upper layer surface 112 (to prevent bonding while being rolled) or paper 168 until use, or HMA that serves as a releaser (when cold) and as an hot melt adhesive. Adhesive application to the unit in the factory saves labour and mess during installation of the sealing unit on site.

Figure 17:
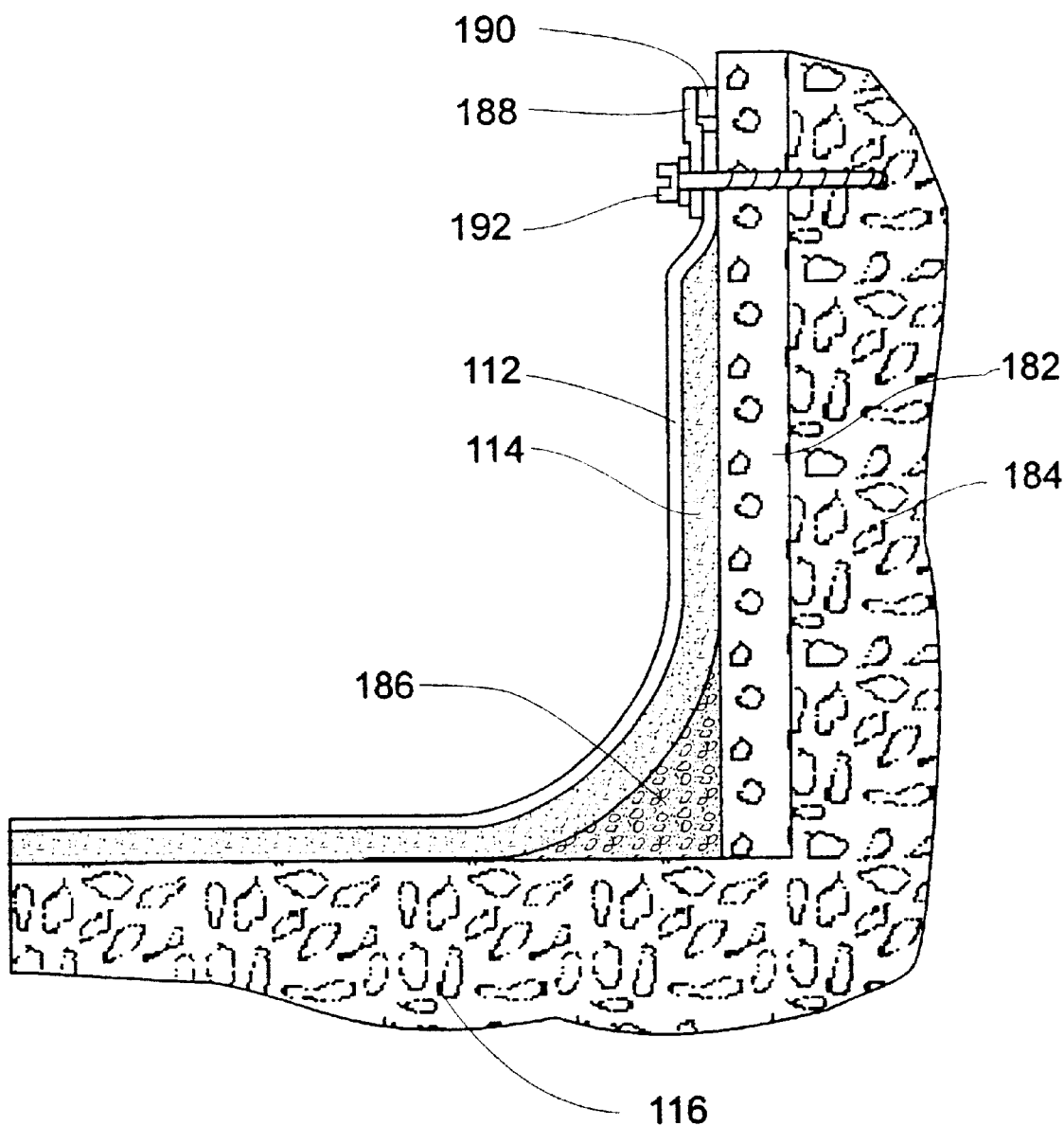
FIG. 17 is a cross-section of the unit applied to a building roof on a banister corner according to the second aspect of the present invention.

FIG. 17 demonstrates the same sealing unit 110, wherein lower layer 114 is bonded to the substrate 116, and to a plaster 182, covered a vertical substrate concrete or breaks made 184 of a banister, and applied upon a curved corner 186. The upper layer 112, of one edge missing the lower layer 114, bonded to the plaster 182 vertically, sealed and protected from peeling by a metal profile e.g., aluminums with niche 188, optionally with niche for elastic sealing cord 190, pressed and attached to the banister with a screw 192. The edge of upper layer 112 optionally may have the lower layer 114 for better adapting to a rough surface.

Figure 18:
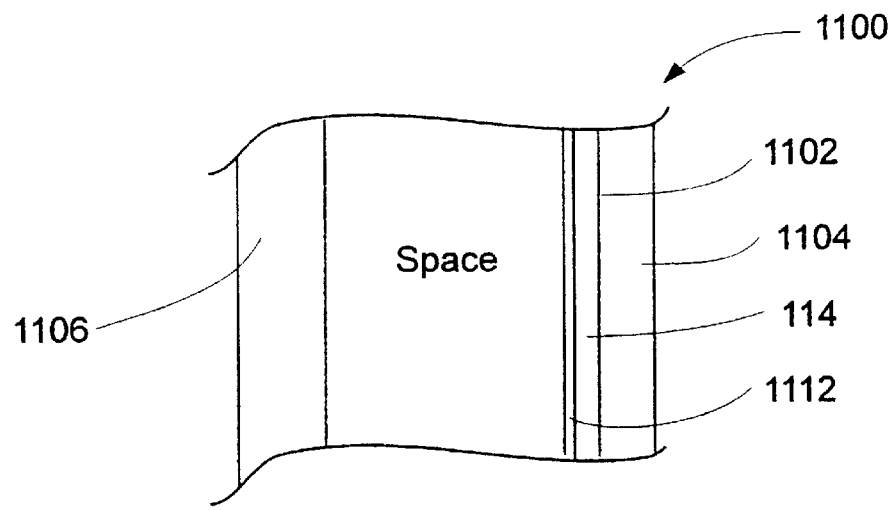
FIG. 18 is a cross-section of the unit applied inside a wall, comprises of external and internal panel according to the second aspect of the present invention.

FIG. 18 demonstrates a cross-section inside a wall 1100, the sealing unit bonded 1102 to an external panel 1104. The foamed elastic lower layer 114, is bonded to the upper layer 112, which is not exposed to mechanical threats, therefore the thickness of this upper layer may be reduced to even about 0.15 mm. (Considering the thickness and the material should include the possibility of low exposure to UV radiation through the crack and the tear in the lower layer. Therefor, sealing upper layer for external construction walls should be designed for outdoor conditions). An internal constructive panel or element 1106, creates a thermal space inside the wall.

FIG. 19 is a schematic sketch demonstrates stages of the typical continuous bridging ability of the improved sheet, during the stage of tearing, above a widening crack; joint-expansion or space constructive elements. In stage "A", there is a crack 1110 on the substrate 1111 covered by here-mentioned multi-layer sheet 1112, having an elastic lower layer 114, eg., 3 mm thick. On stage "B" the crack 1110 became wider (e.g., 2–4 mm), the lower layer 114, in this sample, having an elongation of about 250%—creates a typical narrow zone in the cross-section, as a result of the stress forces. Stress forces in the upper layer 112 are negligible, the upper layer is curved down as more the crack becomes wider. At stage "C" the crack becomes wider and the elongation of the lower layer 114 cannot compensate the tensile and shear forces raising up on the lower part of the lower layer 114, a tear 1113 is appearing, as width of the crack raising up the tear climbs up on the cross-section in correlation to the widening motion of the crack 1114–1117. An important effect of the lower layer elasticity and thickness—reveals a correlation between the tension in the upper layer and the size of the strained area. While both factors are high, the stresses is spreading over a larger area, far away from the zone of the crack.

The upper layer absolute additional length required to compensate the stretching and to provide the continuity of the bridging effect, the additional length—is taken from an extended area which it's width (it's horizontal distance from the crack) is in a scale of tens centimetres (and even more), (instead of only few millimetres where the lower foamed layer is made of almost rigid foam material e.g. polyurethane, with a dull elongation). Hence, it is not only that the lower layer elasticity absorbs locally the tensile and shear stresses of the widening crack, in parallel, the lower layer serves to dissipate and spreading stresses towards much larger area, an enable a drastic reduction of tensile forces in the upper layer 112.

Although the immediate bridging ability of such an elongation can demonstrates tremendously high values of 22–40 mm (if strength ratios and module of elasticity are low enough) on the long run, the practical range of bridging ability will be always less and influenced by many factors. Always it is worthwhile to take a factor of safety. Creep or fatigue of the upper layer should be considered. Both upper and lower layers should be tested under equal strict environmental conditions ensuring that tests will be taken at a relevant sealing temperature range exposing the material to a long period of stresses simulation under accelerated conditions according to ASTM d 2990 (1982) and/or D 2991 (1984) standards.

All mechanical properties of polymers, including creeping, are influenced by temperature rising, stressing period and environmental factors as e.g., changes in curing after the manufacture state, aging and others. These factors may influence the strengths ratios between the lower and the upper layers, on long time range. Therefore, in order to obtain the bridging ability described in FIG. 19, where no. 1117 is schematically representing the maximal elongated state of the edges according to the material elongation ability, the module of elasticity of the lower layer 114 should be much lower than this of the upper layer 112, preferably of no more than about 15% of that of the upper layer. The ratio will provide the lower layer an opportunity to express all of it's elongation ability.

Too low tensile strengths ratio between upper and lower layer, usually, will interrupt the mechanism of breaking of the lower layer, and will prevent the tear in the shear direction (parallel to the upper layer surface) and will not provide the mentioned typical behaviour of continuing tearing, in the shear direction as described in the special embodiment that gives the utmost bridging effect.

In all the preferred embodiments: the lower layer 114, 132, 134, 138 or 140, having tensile strength values derived from the tensile strengths ratios between the upper layer and the lower layer. Those ratios should be taken with care preference to maximize them, raising the ratio should be made under strict test of long-period creeping ASTM d 2990 (1982) and D 2991 (1984), such an approach should be taken always but, specially when intended to provide the mechanism with the ability of carry on the breaking after stage "C" in FIG. 19 no. 1117—in order to express shear tearing along the lower layer cross-section, caused by continuous widening of the crack or space or as a result of lowering the breaking strength of the lower layer by creep or fatigue of the lower layer—under long period of stress.

In a peculiar embodiment of this invention the upper and lower layers are bonded to each other with weakened elastic adhesive, to provide early break of the bonding between the layers The cohesive strength of the adhesive will be of no more than 15% of that of the breaking strength of the upper layer material.

In a most peculiar embodiment, the layers are bonded by a mesh-shape configuration comprising of any type of bonding material or by hot or high frequency welding to each other, wherein inside the closed cells created by the mesh strips, there is no bonding or alternatively, very weak bonding, and the mesh—is of any kind of a shape, in which the strips of the bonding are of a width of no more than 20 mm and the spaces—the closed cell—surrounded by these strips are of an area of no more than 0.5 m². In one preferred configuration the strips are sinuous curved like shaped, crossing each other. The optimal sizes for the stripes (for every shape of a mesh) is 0.5–4 mm, and for the internal spaces—0.5–15 cm².

Using the weakened bonding provides improved control on the separation between the layers, to decrease stress residue transferred to the upper layer, enable raising up the strengths of the lower layer, using the curved shaped bonding strips prevent accumulated stress on straight lines frequent along the normal (90°) of the course of the crack.

The closed-cell mesh configuration prevents fluid from passing in—between the two adjacent layers while the non-bonded spaces provide increased local shear on the bonded strips and possibly even peeling as a result of the typical declined curved zone of the upper layer caused as a result of the stretching of the lower layer.

Another peculiar embodiment—in which the lower layer is perforated in versions of closed-cell shapes all the way of the cross-section or in a part of the cross-section to create a closed cell net-shaped layer bonded to the upper layer comprising of the same mentioned materials and same strengths-ratio for providing a better absorbing ability of stresses. This embodiment has the disadvantage of creating a concave shape for the upper layer, but having a great benefit in bridging ability and cost, mainly for the use in containers.

In any case, a sealing unit according to the present invention may be effected using the following glues to bond the upper and lower layers and/or to bond the unit to the construction: bonding means for outdoor installations, which is a member of a group consisting of self adhesive polyurethane and acrylic resins and mixtures thereof, hot melt thermoplastic adhesive applied with pressure including based on ethylene copolymers, propylene copolymers, polyvinylesters, polyamides, EPDM, polyvinylacetates, ethylene copolymers, modified bitumen including modified SBS, outdoor one component orathan, ethylene-vinyl acetate (EVA) copolymers, pressure sensitive adhesives, hot welding, hot welding adhesives, self adhesive water based copolymer, bonding laminates, hot welding bonding laminates.

In any embodiment according to the present invention in which the upper layer is made of a polymeric material, the thickness of the lower layer is optimally selected between about 0.05–0.25 mm. When foamed material is used for the lower layer, the thickness of the lower layer is optimally selected between about 1.5–4 mm. In embodiments in which the upper layer is made of bituminous material-the thickness of the lower layer is optimally selected between about 0.05–2.5 mm.

The following three examples were carried out in verification of the present specification.

The first two examples were intended to verify the embodiment referred to in FIG. 15.

EXAMPLE 1

A sealing unit according to the second aspect of the present invention was prepared as follows:

UPPER LAYER: 0.8 mm thick, reinforced polyethylene with additives for weathering and UV resistance. Tensile strength of reinforced sheet 40 kg/cm.

REINFORCEMENT OF UPPER LAYER: The upper layer comprised of polis reinforced with a layer of a woven polyethylene flat mesh incorporated in the lower section of the cross-section.

LOWER LAYER: 4 mm thick foamed cross-linked polyethylene, PA200 made by PALZIV, Israel. Tensile strength about 5 kg/cm² (0.5 N/mm²), density 50 kg/m³, elongation at break 230%, water absorption<0.002, allowed operating temperature for sealing purposes −20 to +90° C. The lower layer exhibited compressive deformation and regenerate: above 90% after pressure of 3 kg/cm² for 5 seconds.

BONDING BETWEEN LAYERS: Flame lamination at 240° C.

SUBSTRATE: Cement floor tiles, 30 cm wide 250 cm long. Two coats of primer no. 17, made by Beit Guvrin.

BONDING TO SUBSTRATE: A pressure sensitive adhesive (Adhestick Israel, Adhestick 703) was applied to the lower layer. The adhesive was a self-adhesive pressure-sensitive, non-flammable water-based synthetic elastomer to which was added 5% of a commercial thinner (Adhestick 222). The adhesive was applied by spraying in quantities of 150 gr/m², dried and pressure was applied.

TESTS and RESULTS: The concrete floor which had a thickness of 5 cm. was centrally cut with a saw to a depth of ⅔ of the substrate thickness. The concrete slab was then broken by a blow in order to create a fissure under the unit. The fissure was ragged and not completely straight. A tensile stress was applied at a rate of 15 mm/minute. At about 3 mm separation the lower layer started tearing. At about 7 mm the tear (rupture) crossed the whole profile of the lower layer. At about 20–23 mm the lower layer began tearing in the shear direction (parallel to the upper surface) on the upper part of the lower layer cross-section. While the upper layer remained undamaged until the separation of the substrate halves exceeded 40 mm

EXAMPLE 2

UPPER LAYER: PVC (Elvaloy®) made in HA'OGENPLAST grade formulated for use in contact with Bitumen. The layer has a tensile strength of 30 kg/cm and is reinforced with a polyester screen in the center of its cross section. It has a tear strength of about 40 kg/cm.

REINFORCEMENT OF UPPER LAYER: The upper layer comprised of PVC is reinforced with a layer of a woven polyester mesh incorporated in a lower section thereof to form a laminate.

BONDING BETWEEN LAYERS: A pressure sensitive adhesive (Adhestick Israel, Adhestick 703) was applied by spreading and drying between the layer. The adhesive was a self-adhesive pressure-sensitive, non-flammable water-based synthetic elastomer to which was added 5% of a commercial thinner (Adhestick 222).

LOWER LAYER: Foamed cross-linked polyethylene, type PA2 made by PALZIV, Israel. Tensile strength 5 kg/sq. cm, density 50 kg/m³, elongation at break 230%, water absorption<0.002, allowed operating temperature for sealing purposes −20 to +90° C.

The unit was attached to the substrate with a contact adhesive as described in Example 1.
SUBSTRATE: As Example 1.
BONDING TO SUBSTRATE: contact glue, made by Adhestick, Israel, Adhestick 703.
TESTS and RESULTS: As example 1. The damage to the upper layer had a 1% peeling of the lower lamination. At 4 mm separation the lower layer started tearing.

EXAMPLE 3

UPPER LAYER: Reinforced bitumen 4 mm thick. Tensile strength: 18 kg/cm the layer is reinforced with fibers and a screen of woven polyester.

LOWER LAYER: 3 mm thick foamed cross-linked polyethylene, type PA300 made by PALZIV, Israel. Tensile strength about 2.9 $kg/cm^2$ density 33 $kg/m^3$, elongation at break 180% water absorption<0.002, allowed operating temperature for sealing purposes −20 to +90° C.

BONDING BETWEEN LAYERS: Pressure sensitive Bituminous emulsion (Gumiflex®) with the addition of 30% self-adhesive latex, bitumen fillers and fibers, made by BITUM Israel. 200 $gr/m^2$ was used. Pressure was applied after drying.
SUBSTRATE: As Example 1.
BONDING TO SUBSTRATE: As Example 1.
TESTS and RESULTS: Test as example 1. No damage to the upper layer. At 3 mm separation the lower layer started tearing. At about 18–20 mm tear in the shear direction began, and separates the lower layer from the upper layer in the upper surface of the lower layer and in the bonding. The upper layer expressed stretching but remained undamaged until the separation of the substrate halves exceeded 40 mm.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is of important to note that wherever is mentioned an embodiment or any technical detail concerning with the present invention, it is also including the meaning of a method for sealing the surfaces and a method for applying the sealing unit by bonding the sealing unit to the substrate including the method to build the unit by separate stages from separate elements in the factory or on site, applying by spraying, brushing or spreading.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A sealing sheet assembly bondable to a construction surface comprising:
   (a) an upper layer of a first substance, said upper layer being selected inherently fluid impermeable; and
   (b) a lower flexible layer of a second substance, said lower flexible layer being bondable to the construction surface, said upper layer and said lower flexible layer being at least partially attached to one another;
   wherein a combination of said upper layer, said lower layer and said at least partial attachment of said layers to one another are selected such that tensile forces resulting from constructional movements acting upon the sealing sheet, result in a local detachment or relative displacement of said upper layer and said lower flexible layer, thereby an ability of said lower flexible layer of transmitting said forces onto said upper layer is remarkably reduced, resulting in improved service of the sealing cover as a whole, said at least partial attachment is selected such that a spread of a leakage between said layers via a tear formed in said upper layer is locally restricted.

2. The sealing sheet assembly of claim 1, wherein said lower flexible layer is made of bitumen or modified bitumen.

3. The sealing sheet assembly of claim 1, wherein said combination of said upper layer, said lower layer and said at least partial attachment of said layers to one another are selected such that peeling forces acting to separate said layers of the sealing sheet, result in a detachment of said upper layer and said lower flexible layer, such that said upper layer remains substantially undamaged.

4. The sealing sheet assembly of claim 1, wherein said lower layer is capable of at least 200% elongation.

5. The sealing sheet assembly of claim 1, wherein said attachment is capable of at least 200% elongation.

6. The sealing sheet assembly of claim 1, wherein said at least partial attachment includes a formation of closed cells between said layers.

7. The sealing sheet assembly of claim 6, wherein said closed cells having an average area of 1 square millimeter to 100 square centimeters per cell.

8. The sealing sheet assembly of claim 6, wherein zones which serve for attaching said upper layer and said lower flexible layer encompass about 1% to about 25% of a total area of the sealing sheet assembly, whereas said closed cells encompass about 99% to about 75%, respectively, of said total area.

9. The sealing sheet assembly of claim 8, wherein said zones are arranged in crossing or tangential stripes.

10. The sealing sheet assembly of claim 9, wherein said stripes have a width ranging between 0.1 millimeters and 15 millimeters.

11. The sealing sheet assembly of claim 9, wherein said stripes are substantially linear stripes.

12. The sealing sheet assembly of claim 9, wherein said stripes follow a wave pattern.

13. The sealing sheet assembly of claim 6, wherein attaching said upper layer and said lower flexible layer to one another to form said closed cells therebetween is effected via an adhesive.

14. The sealing sheet assembly of claim 13, wherein said adhesive is a self adhered pressure sensitive adhesive.

15. The sealing sheet assembly of claim 6, wherein attaching said upper layer and said lower flexible layer to one another to form said closed cells therebetween is effected via welding.

16. The sealing sheet assembly of claim 6, wherein attaching said upper layer and said lower flexible layer to one another to form said closed cells therebetween is effected via a thermoplastic adhesive screen.

17. The sealing sheet assembly of claim 6, further comprising a laminate placed between said upper and lower flexible layers for restricting migration of plasticizers from said upper layer to said lower flexible layer.

18. The sealing sheet assembly of claim 17, wherein said laminate is substantially fully attached to said upper layer, whereby said closed cells are formed between said laminate and said lower flexible layer.

19. The sealing sheet assembly of claim 17, wherein said laminate is attached to said lower flexible layer, whereby said closed cells are formed between said laminate and said upper layer.

20. The sealing sheet assembly of claim 6, wherein a lower surface of said upper layer or an upper surface of said lower layer is formed with ridges which serve for effecting said partial attachment and said formation of closed cells.

21. The sealing sheet assembly of claim 1, wherein said upper layer has a given breaking strength, and said lower flexible layer has a breaking strength at least 60% lower than said given breaking strength of said upper layer.

22. The sealing sheet assembly of claim 21, wherein said breaking strength of said lower flexible layer is at least 80% lower than said given breaking strength of said upper layer.

23. The sealing sheet assembly of claim 1, wherein said upper layer has a given breaking strength, and said attachment between said layers has a breaking strength at least 30% lower than said given breaking strength of said upper layer.

24. The sealing sheet assembly of claim 1, wherein said upper layer has a given thickness, and said lower flexible layer has a thickness at least 65% lower than said given thickness of said upper layer.

25. The sealing sheet assembly of claim 1, wherein said upper layer includes a reinforcing structure embedded therein.

26. The sealing sheet assembly of claim 25, wherein said reinforcing structure protrudes from a lower surface of said upper layer to form ridges thereon which serve for effecting said partial attachment.

27. The sealing sheet assembly of claim 1, further comprising a cloth material attached underneath said lower flexible layer and forms a part thereof, said cloth material is bondable to the construction surface.

28. The sealing sheet assembly of claim 1, wherein said second substance is selected such that said lower flexible layer restricts migration of plasticizers from said upper layer to the construction surface.

29. The sealing sheet assembly of claim 1, wherein said lower flexible layer is a foamed substance.

30. The sealing sheet assembly of claim 1, wherein said upper layer and said lower flexible layer being substantially fully attached to one another via a week attachment.

31. The sealing sheet assembly of claim 30, wherein said upper layer and said lower flexible layer being further attached to one another sporadically via a stronger attachment.

32. The sealing sheet assembly of claim 31, wherein said weak attachment is effected by an approach selected from the group consisting of weak welding and a use of a weak adhesive, said stronger attachment is effected by an approach selected from the group consisting of stronger welding and a use of a stronger adhesive.

33. The sealing sheet assembly of claim 30, wherein said weak attachment is effected by an approach selected from the group consisting of weak welding and a use of a weak adhesive.

34. A multi-layer unit for bonding onto a surface of a construction and thereby sealing the surface of the construction comprising:
(a) an upper sealing flexible layer having at least it's outer part protected against chemical and physical environmental influence; and
(b) a lower layer bonded to said upper layer, said lower layer being elastic, closed cell, foamed polymeric material having a module of elasticity significantly lower than that of the upper layer and having tensile strength significantly lower than that of said upper layer, said material having an elongation at break of at least 25% in a designated temperature range, and a gas volume in a range of 65% to 99% of it's total volume;
wherein if said upper layer is thermoplastic or thermosetic, and further wherein if said lower layer has a thickness of above about 2 mm, or if said upper layer is of bitumen, then, said upper and lower layers are selected such that if said tensile strength of said upper layer, according to it's definition in ASTM Standard D-751, method A, is expressed in units of Newton per 50 mm width, and said tensile strength of said lower layer, according to it's definition in Din Standard 53571, is expressed in units of Newton per 1 mm squared, then, the ratio between said tensile strength of said upper layer and said tensile strength of said lower layer is greater than 200, whereas, if said upper layer is thermoplastic or thermosetic, and further wherein if said lower layer has a thickness of below about 2 mm, then, said lower and upper layers are selected such that a ratio of said tensile strengths of said upper and lower layers, when expressed in said units, respectively, is greater than 1000.

35. A sealing unit according to claim 34, wherein said lower layer is bonded to said substrate surface to be sealed.

36. A sealing unit according to claim 34, wherein said lower layer is bonded to at least one layer, intended to be bonded to said substrate.

37. A sealing unit according to claims 34, wherein said lower layer having a module of elasticity of no more than 50% of that of the upper sheet.

38. A sealing unit according to claims 34 wherein said lower layer comprises at least one material from the group of foamed polyolefines.

39. A sealing unit according to claim 34, wherein said lower layer comprises a member of a group consisting of foamed polyethylene, low-density-polyethylene, very-low-density-polyethylene, linear copolymer, linear polyethylene, ethylene-vinyl-acetate, ethylene-propylene-diene-monomer, plasticized polyvinyl chloride, polyvinyl-chloride plasticized by solid copolymer plasticizer vulcanized foam rubber, adapted linear polyethylene.

40. A sealing unit according to claims 34, wherein said lower layer comprises foamed polyethylene with ethylene-vinyl-acetate.

41. A sealing unit according to claims 34, wherein at least one of the lower layer polymers is cross-linked.

42. A sealing unit according to claims 34, wherein said upper layer comprises at least one member of a group consisting of polyethylene, ethylene-propylene-diene-monomer, styrene-butadiene-rubber based elastomer for roofing, acrylic based elastomer for roofing, plasticised poly-vinyl-chloride and bituminous roofing sheet.

43. A sealing unit according to claims 34, wherein said upper layer protected against ultra violet radiation, weathering or aging.

44. A sealing unit according to claim 34, wherein said multi-layer unit is bonded to the substrate or a layer/s upon said substrate, by bonding means for outdoor installations, which is a member of a group consisting of: self adhesive polyurethane and acrylic resins and mixtures thereof, hot melt thermoplastic adhesive applied with pressure including based on ethylene copolymers, propylene copolymers, polyvinylesters, polyamides, polyvinylacetates, ethylene copolymers, ethylene-vinyl acetate (EVA) copolymers, pressure sensitive adhesives, hot welding, hot welding adhesives, self adhesive water based copolymer, bonding laminates, hot welding bonding laminates.

45. A sealing unit according to claims 34, wherein said lower layer is bonded to the upper sheet by bonding mean, which is a member of a group consisting of: self adhesive polyurethane and acrylics, hot melt thermoplastic adhesive applied with pressure, pressure sensitive adhesives, hot welding, hot welding adhesives, hot welding using hot air or flame, high frequency welding, bonding laminates, hot welding bonding laminates, ethylene butyl acrylate (EBA) copolymers based for deep freeze HMA specially low temperature climates, to ensure superior flexibility.

46. A sealing unit according to claim 34, wherein said upper and lower layers are made of the same basic polymer.

47. A sealing unit according to claim 34, wherein said multi-layer unit is aimed to be bonded to a wall or upon internal face of a panel, inside a wall, to prevent fluid passing through expected cracks or spaces in said wall or said panel, wherein the thickness of the upper said flexible layer reduce to minimal levels of 0.15–0.60 mm.

48. A sealing unit according to claim 47, wherein the module of elasticity of the lower layer is no more than 10% of that of the upper layer.

49. A sealing unit according to claim 47, wherein said panel or wall is prefabricated, comprising said sealing unit hither includes additional part of said unit to provide overlap on top of the near next panel on site.

50. A multi layer sealing unit according to claim 34, for sealing said surfaces under a concrete cover or under concrete and bituminous cover—for waterproofing traffic or industrial platform, further including another foamed elastic polymeric layer, alike the lower layer, bonded upon said upper sheet, the strength ratios, elongation at break and density values of here mentioned upper foamed elastic polymeric layer are as defined for the lower layer. The central flexible waterproof sheet having a thickness of at least 0.6 mm.

51. A scaling unit according to claim 34, further including more than one of the lower layer, wherein two or more lowest layers arm of a closed cell elastic foamed polymeric material bonded to each other and to the upper layer at least one of the foamed layers differs from the other by at least one mechanical or chemical property.

52. A sealing unit according to claim 51, wherein the lowest said foamed layer having an unlimited module of elasticity higher than that of the other/s said lower layer/s, and at least one of the middle said lower layer/s having a module of elasticity of no more than 20% of that of the upper sheet.

53. A sealing unit according to claim 34, further including one of the following elements: metal foil, solvent and plasticizer barrier, thin laminate, bonded between said upper and said lower layers.

54. A sealing unit according to claim 34, further including one of the following elements: metal foil, metal film, solvent and plasticizer barrier, thin laminate, bonded between said lower layer and said substrate.

55. A sealing unit according to claim 34, wherein said upper layer is reinforced by one or more of the group consisting of textile sheet, screen and fibres.

56. A sealing unit according to claim 34, further including an adhesive coated pressure sensitive or hot melt adhesive or sealant adhesive compounds, on the lower surface, protected by a releasing agent or paper applied on the sheet.

57. A sealing unit according to claim 34, wherein said sealing flexible sheet comprises a reinforced bitumen sheet.

58. A sealing unit according to claim 34, wherein said bonding between the upper and lower layers cohesive strength is weakened having no more shear strength of 20% of that of the upper layer.

59. A sealing unit according to claim 34, wherein said lower layer is capable of compressive deformation of at least 70% and regeneration thereafter.

60. A sealing unit according to claim 34, further including a reflective paint or a metal foil with low emissivity, to reject infra red and ultra violet radiation, bonded to the upper external surface of the unit.

61. A sealing unit according to claim 34, further including an elastic adhesive or bonded laminate between said upper and lower layers.

62. A sealing unit according to claim 34, further including an upper reinforcement combined with the upper part of the lower layer, or bonded to the upper surface of the lower layer profile.

63. A sealing unit according to claim 34, wherein said upper layer is an emulsion or liquid at the time of application.

64. A sealing unit according to claim 34, wherein said upper layer is a separate cured sealing unit at the time of application.

65. A sealing unit according to claim 34, wherein said upper layer is applied separately by spraying, brushing or spreading or by bonding to the lower layer after bonding the lower layer to the substrate.

66. A sealing unit according to claim 34, wherein said foamed material of said lower layer has a max' tensile and shear strength of no more than 20% according to the units definitions in claim 34, of that of the upper sheet.

67. A multi-layer unit for bonding onto a surface of a construction and thereby sealing the surface of the construction comprising:

(a) an upper sealing flexible layer having at least it's outer part protected against chemical and physical environmental influence; and (b) a lower layer boned to said upper layer, said lower layer being flexible plastic, closed cell, foamed polymeric material having tensile and shear strengths significantly lower than that of said upper layer, said material having a gas volume in a range of 65% to 99% of it's total volume;

wherein if said upper layer is thermoplastic or thermosetic, and further wherein if said lower layer has a thickness of above about 2 mm, or if said upper layer is of bitumen, then, said upper and lower layers are selected such that if said tensile strength of said upper layer, according to it's definition in ASTM Standard D-751, method A, is expressed in units of Newton per 50 mm width, and said tensile strength of said lower layer, according to it's definition in Din Standard 53571, is expressed in units of Newton per 1 mm squared, then, the ratio between said tensile strength of said upper layer and said tensile strength of said lower layer is greater than 200, whereas, if said upper layer is thermoplastic or thermosetic, and further wherein if said lower layer has a thickness of below about 2 mm, then, said lower and upper layers are selected such that a ratio of said tensile strengths of said upper and lower layers, when expressed in said units, respectively, is greater than 1000.

68. A multi-layer unit according to claim 67, wherein bonding said upper and lower layers is effected by an adhesive or welding such that non-bonded closed cells are formed between said upper and lower layers.

69. A multi-layer unit according to claim 68, wherein bonding said upper and lower layers is effected by an adhesive net structure.

70. A multi-layer unit according to claim 68, wherein bonding said upper and lower layers is effected by welding in a net structure.

71. A multi-layer unit for bonding onto a surface of a construction and thereby sealing the surface of the construction comprising:

(a) an upper sealing flexible layer having at least it's outer part protected against chemical and physical environmental influence; and (b) a lower layer bonded to said upper layer, said lower layer being elastic, closed cell, foamed polymeric material; wherein bonding said upper and lower layers is effected by an adhesive or welding, such that non-bonded closed cells are formed between said upper and lower layers.

\* \* \* \* \*